US008833826B2

(12) United States Patent
Garcia et al.

(10) Patent No.: US 8,833,826 B2
(45) Date of Patent: Sep. 16, 2014

(54) MOBILE ROBOTIC MANIPULATOR SYSTEM

(75) Inventors: Pablo E. Garcia, Menlo Park, CA (US);
Thomas P. Low, Belmont, CA (US);
Harsha Prahlad, Cupertino, CA (US);
Daniel Aukes, Somerville, MA (US);
Susan Kim, Menlo Park, CA (US); **Roy
D. Kornbluh**, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 14/005,092

(22) PCT Filed: Mar. 21, 2012

(86) PCT No.: PCT/US2012/029860
§ 371 (c)(1),
(2), (4) Date: Oct. 18, 2013

(87) PCT Pub. No.: WO2012/129254
PCT Pub. Date: Sep. 27, 2012

(65) Prior Publication Data
US 2014/0035306 A1  Feb. 6, 2014

Related U.S. Application Data

(60) Provisional application No. 61/454,945, filed on Mar. 21, 2011, provisional application No. 61/454,948, filed on Mar. 21, 2011, provisional application No. 61/466,900, filed on Mar. 23, 2011, provisional application No. 61/466,902, filed on Mar. 23, 2011.

(51) Int. Cl.
*B25J 15/00* (2006.01)
*B25J 19/00* (2006.01)
*B25J 15/08* (2006.01)

(52) U.S. Cl.
CPC ............ *B25J 15/083* (2013.01); *B25J 15/0009* (2013.01); *B25J 19/00* (2013.01); *B25J 15/0085* (2013.01); *Y10S 294/907* (2013.01); *Y10S 901/39* (2013.01)
USPC .............. 294/111; 294/213; 294/907; 901/39

(58) Field of Classification Search
CPC ....... B25J 15/083; B25J 15/0009; B25J 9/104
USPC ................. 294/106, 111, 198, 213, 200, 907; 901/38, 39; 623/63, 64; 188/71.5
See application file for complete search history.

(56) References Cited

U.S. PATENT DOCUMENTS 5,062,855 A * 11/1991 Rincoe ........................... 623/24
5,108,140 A    4/1992 Bartholet
(Continued)

FOREIGN PATENT DOCUMENTS

JP         2003305681         10/2003

OTHER PUBLICATIONS

International Preliminary Report on Patentability in related international patent application No. PCT/US12/29860, mailed on Oct. 3, 2013; 5 pages.

(Continued)

*Primary Examiner* — Gregory Adams
*Assistant Examiner* — Gabriela Puig
(74) *Attorney, Agent, or Firm* — Schmeiser, Olsen & Watts; Michael Rodriquez

(57) ABSTRACT

Robotic hands and finger modules include an underactuated finger with multiple joints including a distal joint, an intermediate joint, and a proximal joint. A brake subsystem in communication with each of the joints selectively locks and unlocks the joints individually. A robotic hand can selectively lock the joints of a finger individually such that one or more joints are locked while one or more joints are unlocked. In addition, the finger module can drive a tendon coupled to the joints to flex the underactuated finger in a manner determined by which of the joints is locked and which of the joints is unlocked. A robotic hand can move an underactuated finger with its distal and proximal joints unlocked until the finger makes contact with an object, and lock the proximal joint, in response to contact made with the object, while the distal joint remains unlocked.

30 Claims, 21 Drawing Sheets

(56) References Cited

U.S. PATENT DOCUMENTS

| | | | |
|---|---|---|---|
| 5,570,920 A | 11/1996 | Crisman et al. | |
| 7,168,748 B2* | 1/2007 | Townsend et al. | 294/106 |
| 7,296,835 B2* | 11/2007 | Blackwell et al. | 294/111 |
| 7,361,197 B2* | 4/2008 | Winfrey | 623/64 |
| 7,553,363 B2 | 6/2009 | Dellinger et al. | |
| 7,654,595 B2 | 2/2010 | Yokoyama et al. | |
| 8,470,051 B2* | 6/2013 | Moyer et al. | 623/64 |
| 2009/0028670 A1 | 1/2009 | Garcia et al. | |
| 2009/0030282 A1 | 1/2009 | Garcia et al. | |
| 2010/0061835 A1 | 3/2010 | Sim | |
| 2010/0181792 A1* | 7/2010 | Birglen | 294/106 |
| 2010/0259057 A1* | 10/2010 | Madhani | 294/106 |
| 2010/0271746 A1 | 10/2010 | Pelrine et al. | |
| 2011/0193362 A1 | 8/2011 | Prahlad et al. | |
| 2012/0013139 A1* | 1/2012 | Torres-Jara | 294/110.1 |
| 2013/0057004 A1* | 3/2013 | Murata et al. | 294/106 |
| 2013/0175816 A1* | 7/2013 | Kawasaki et al. | 294/198 |
| 2013/0338796 A1* | 12/2013 | Moyer et al. | 623/64 |

OTHER PUBLICATIONS

International Search Report and Written Opinion in related International patent application No. PCT/US2012/029860, mailed on Oct. 25, 2012; 8 pages.

Laliberté et al., "Underactuation in robotic grasping hands", Machine Intelligence & Robotic Control, 2002, pp. 1-11, vol. 4, No. 3; 11 pages.

* cited by examiner

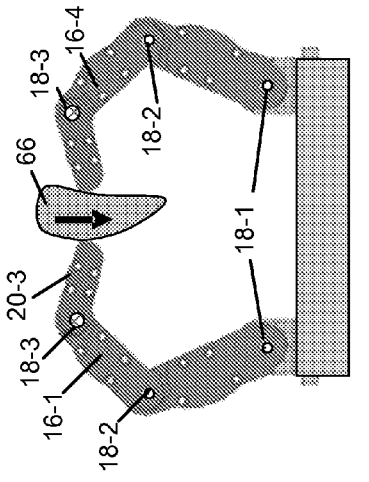
FIG. 12A
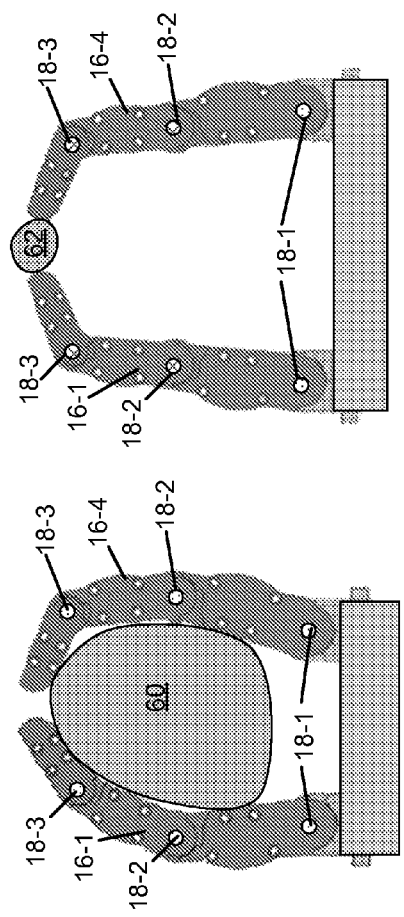
FIG. 12B
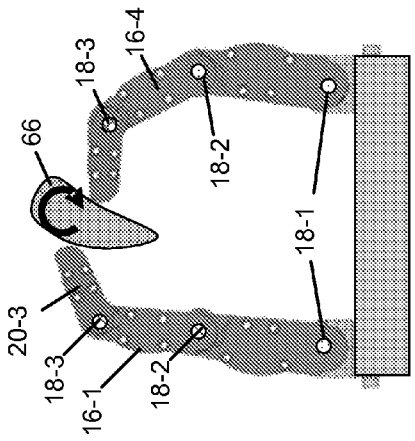
FIG. 13
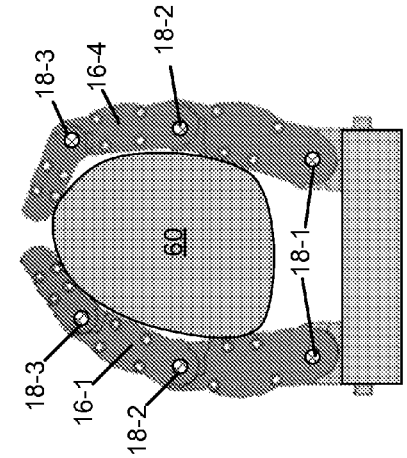
FIG. 14
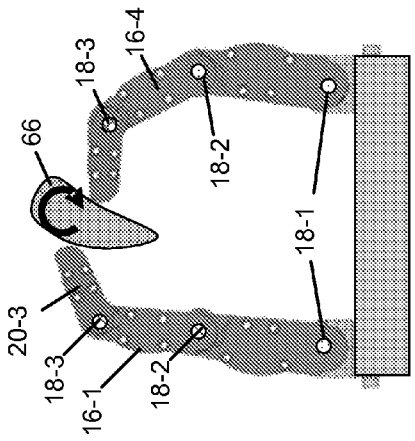
FIG. 15A
FIG. 15B

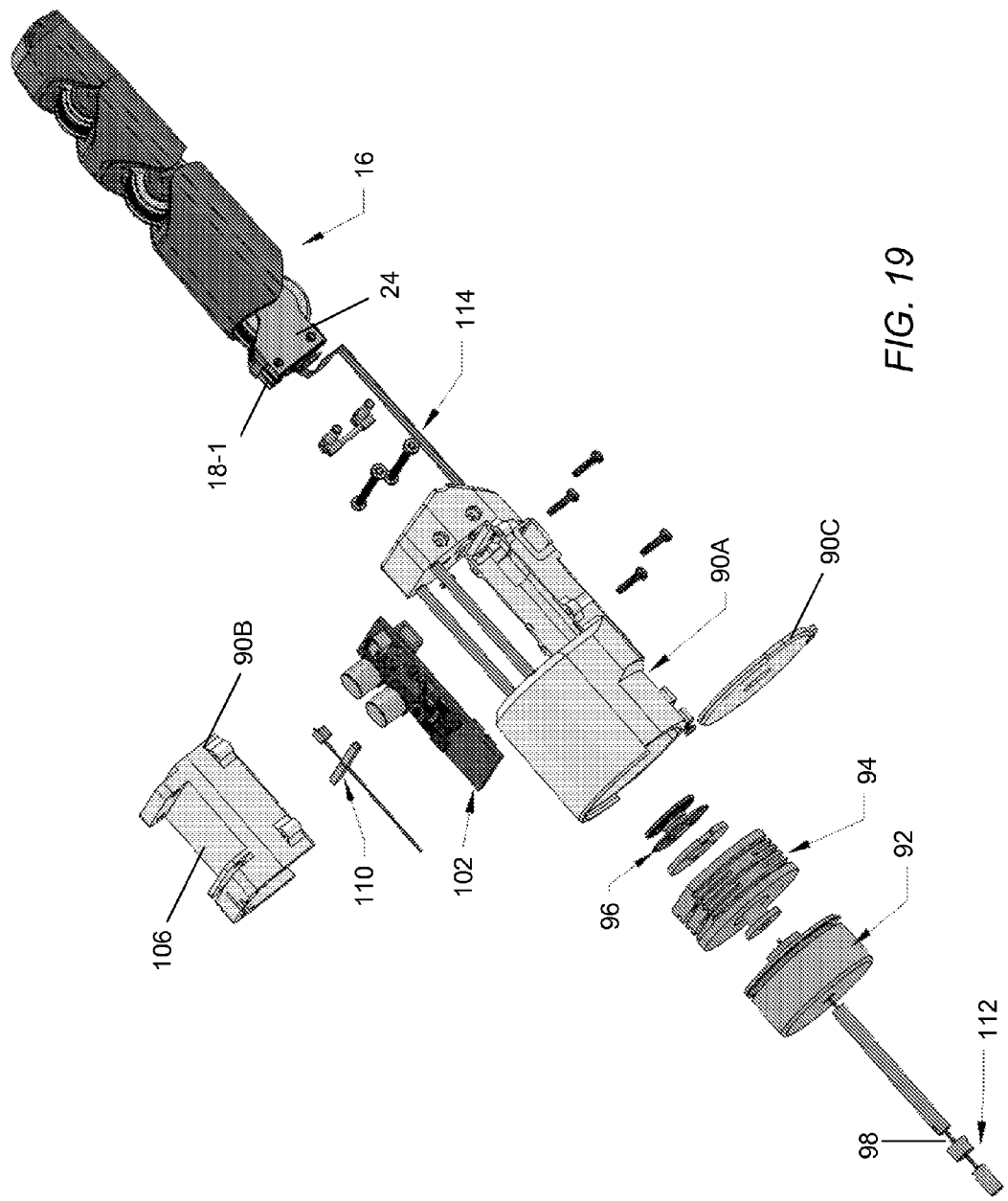

MOBILE ROBOTIC MANIPULATOR SYSTEM

RELATED APPLICATIONS

This application claims priority to and the benefit of U.S. provisional application No. 61/454,945, filed on Mar. 21, 2011, titled "Improved Twisted String Actuator—I", U.S. provisional application No. 61/454,948, filed on Mar. 21, 2011, titled "A Modular Robotic Appendage—"A Finger"", U.S. provisional application No. 61/466,900, filed on Mar. 23, 2011, titled "Improved Twisted String Actuator—II", and U.S. provisional application No. 61/466,902, filed on Mar. 23, 2011, titled "A Mobile Robotic Manipulator System", the entireties of which applications are incorporated by reference herein.

GOVERNMENT RIGHTS IN THE INVENTION

This invention was made with government support under Contract No. W91-CRB-10-C-0139 awarded by the US Army. The government has certain rights in this invention.

FIELD OF THE INVENTION

The invention relates generally to robotic manipulator systems. More specifically, the invention relates to robotic appendages.

BACKGROUND

Many applications can benefit from the use of dexterous robotic hands that are capable of performing human-like tasks, such as grasping and manipulating a wide variety of objects. To achieve such versatility, the development of such robotic hands has turned to the use of underactuated fingers because underactuated fingers can self-adapt to wrap around objects, especially unknown objects. Although effective for power grasps, however, underactuation may perform poorly in precision grasps, in which the positions of the fingertips need to be controlled accurately, and where contact points are limited to distal links.

SUMMARY

In some aspects, the invention relates to robotic hands, finger modules, and underactuated finger assemblies, wherein a finger assembly comprises a finger skeleton with multiple joints including a distal joint, an intermediate joint, and a proximal joint. The finger assembly further comprises a brake subsystem, in communication with each of the joints, adapted to selectively lock and unlock the joints individually.

In another aspect, the invention relates to a method of moving a robotic hand with an underactuated finger having a plurality of joints. The method comprises selectively locking the joints individually such that one or more of the joints are locked while one or more of the joints are unlocked, and driving a tendon coupled to the joints to flex the underactuated finger in a manner determined by which of the joints is locked and which of the joints is unlocked.

In still another aspect, the invention relates to a method of grasping an object using a robotic hand having an underactuated finger with a distal joint and a proximal joint. The method comprises moving the underactuated finger with its distal and proximal joints unlocked until the finger makes contact with an object, and locking the proximal joint, in response to contact being made with the object, while the distal joint remains unlocked.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 12A and FIG. 12B are diagrams of example modes of operation for fingers grasping an object.

FIG. 13 is a diagram showing the use of selective locking of the joints of two opposing fingers to perform a precision grasp on a spherical object.

FIG. 14 is a diagram showing the use of selective locking of the joints of two opposing fingers to perform a precision grasp on a flat object.

FIG. 15A and FIG. 15B are diagrams showing the use of selective locking of the joints of two opposing fingers to hold, manipulate, and re-grasp an object.

FIG. 19 is a diagram of an exploded view of one embodiment of the finger module including the finger assembly and the actuator module.

DETAILED DESCRIPTION

Embodiments of robotic manipulators (or simply robotic hands) described herein employ selective underactuation, compliant force control, and multimodal tactile, position, and force sensing. Underactuation, when applied a mechanical device, signifies that the device has fewer actuators than degrees of freedom. Controllable selective underactuation, as described below, enable a robotic hand to grasp unknown objects using a power grasp, and then to switch to a precision grasp in order to perform operations requiring fine control of fingertip position and force. In general, a power grasp involves the palm and fingers in combination to secure an object firmly in the hand, whereas a precision grasp involves the fingertip regions to control the pose of an object precisely. With controllable selective underactuation, a robotic hand can employ a combination of power and precision grasps to hold, manipulate, and reposition an object, a process referred to as re-grasping.

The capabilities of the robotic hand extend from the capabilities designed into its individual underactuated fingers. In brief overview, the joints of each underactuated finger can lock and unlock independently in response to an electrical signal. This selective locking of joints allows a single actuator to multiplex the flexing of the finger joints. For example, each underactuated finger can passively wrap around an object of unknown shape to cooperate in a power grasp, and then selected joints of the fingers can be locked so the fingers can cooperate in a pincer to perform a precision grasp. A transmission integrated into each underactuated finger is back-driveable and has built-in elasticity, making the robotic hand resistant to shock and overload.

Grasping surfaces (i.e., skin) of the fingers can be fitted with electroadhesive pads to control adhesion and generate friction forces that overcome slippage and enhance the hand's grasping capabilities, yet without having to exert a gripping force that could crush or damage the object. The skin is abrasion-resistant and controllably compliant; the finger can be "soft" when making contact with objects of unknown shape and structure, and firm to control its precision precisely after making contact. Sensor assemblies integrated in the skin can sense contact pressure, slippage, and vibration. Fingers can detect contact points, grasping and pinching forces, the stability of the object, and slippage. These abilities enable manipulation and re-grasping of objects by rolling and sliding objects between fingertips. Other sensor devices can be incorporated into the finger to sense other types of parameters, for example, temperature and pressure.

Figure 1:
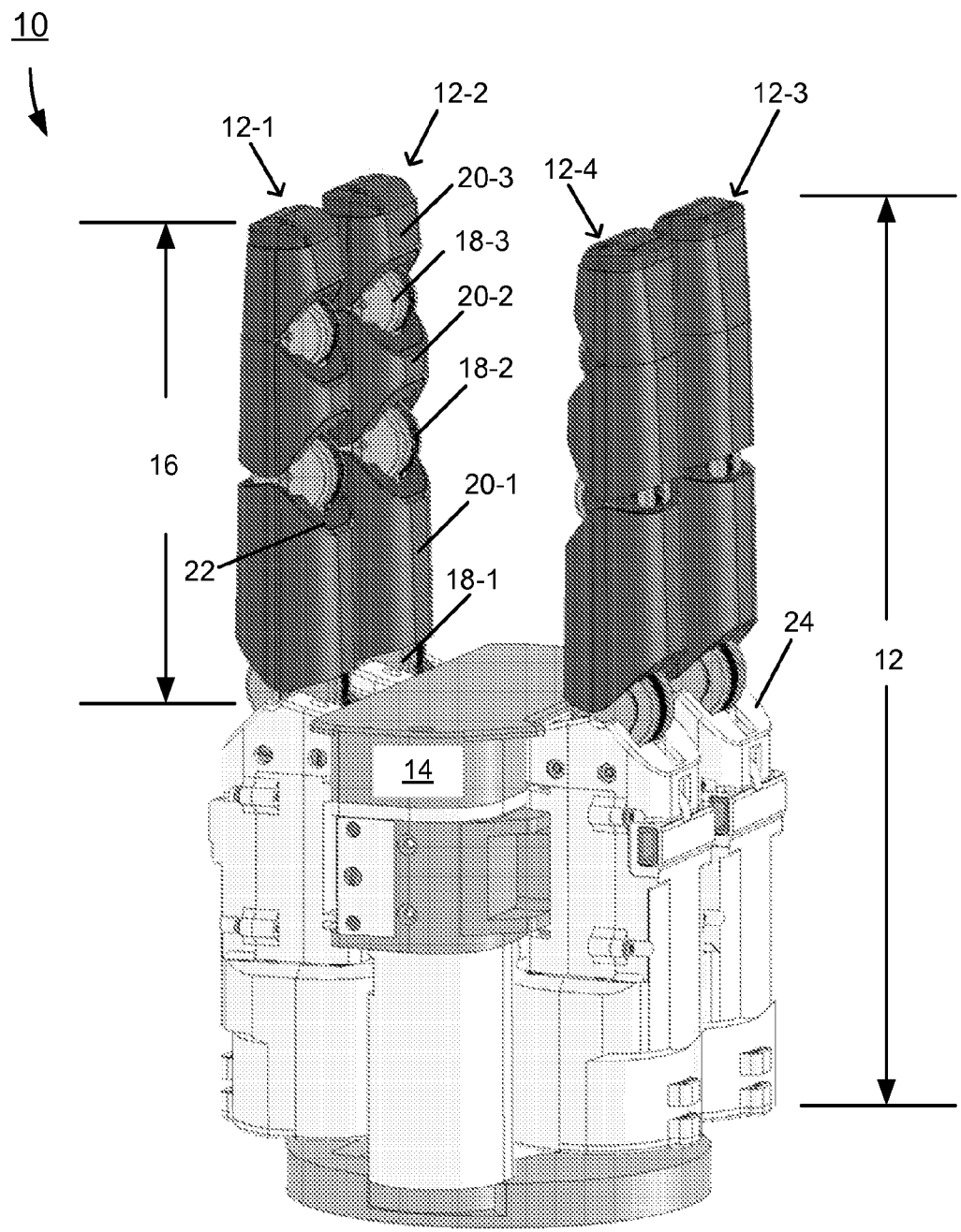
FIG. 1 is a diagram of an embodiment of robotic manipulator (or hand) having four finger modules.

FIG. 1 is a diagram of an embodiment of a robotic hand 10 having four finger modules 12-1, 12-2, 12-3, 12-4 (generally, 12) coupled to a palm assembly 14. Each finger module 12 comprises a finger assembly (or simply finger) 16 with a proximal joint 18-1, an intermediate joint 18-2, and a distal joint 18-3. The proximal joint 18-1 couples a proximal phalange 20-1 to a finger mount 24, the intermediate joint 18-2 couples an intermediate phalange 20-2 to the proximal phalange 20-1, and the distal joint 18-3 couples a distal phalange 20-3 (also called the fingertip) to the intermediate phalange 20-2. The finger mount 24 is part of an actuator module, described in detail below. Each finger 16 has multilayer skin 22. The palm assembly 14 can also be covered in a 'skin' adapted for grasping objects.

Each finger 16 can flex forward or backward at any of the joints and has three degrees of freedom (DOF); although the finger can have fewer or more DOFs, depending upon the particular application. As described in more detail below, a single actuator controls all three degrees of a finger, with selective locking of the joints allowing the single actuator to multiplex the flexing of the joints, individually, or in groups. By locking and unlocking the joints in rapid succession, the joints can appear to move and be controlled simultaneously.

In this embodiment, the finger modules 12-1, 12-2 are movably coupled to one side of the palm assembly 14, and the other finger modules 12-3, 12-4 are fixed in position to the opposite side of the palm assembly 14. The finger modules 12-1, 12-2 can move together or apart. Fixing the location of the other finger modules 12-3, 12-4, makes their locations known and predictable, which is advantageous for precision grasps involving pinching by opposing finger modules (e.g. 12-1 and 12-4).

Although described herein with reference to robotic hands with four fingers, the principles can extend to those embodiments with fewer or more than four.

Figure 2:
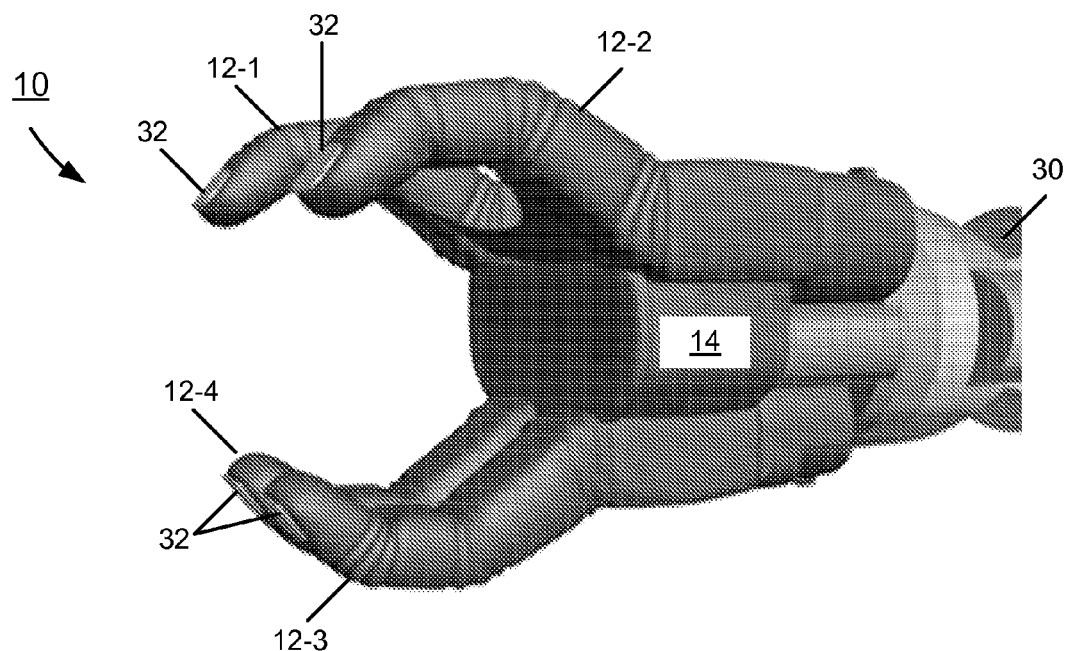
FIG. 2 is a side view of one embodiment of the robotic manipulator.
Figure 3:
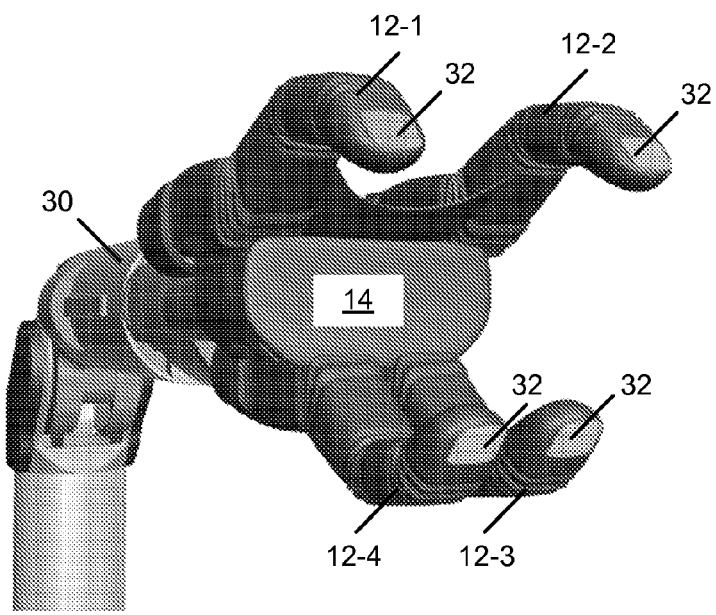
FIG. 3 is a front view of the embodiment of the robotic manipulator of FIG. 2.

FIG. 2 and FIG. 3 show a side view and front view, respectively, of one embodiment of the robotic hand 10 extending from a forearm 30. Each finger 16 has a protective fingernail 32 at its fingertip. The fingernails of opposing fingers can be used to grasp small edges.

Figure 6:
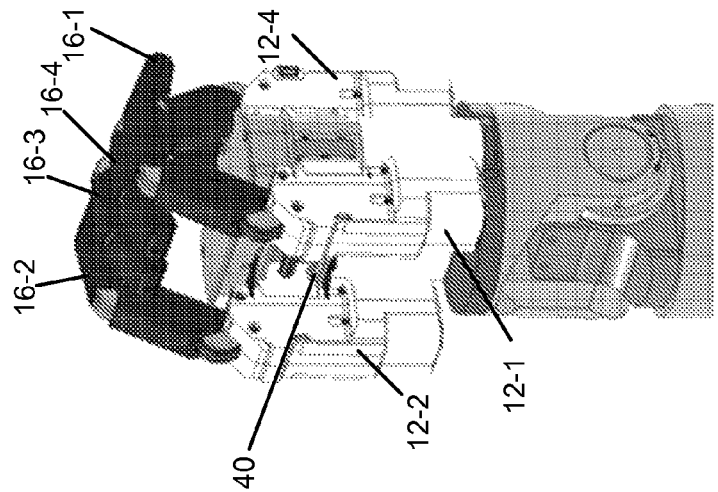
FIG. 6 is a view of an embodiment of the robotic manipulator with the finger modules in an interlaced configuration.
Figure 5:
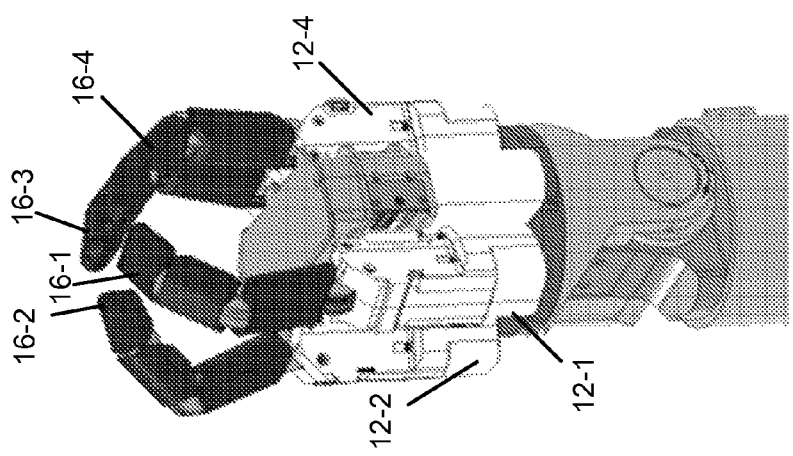
FIG. 5 is a view of an embodiment of the robotic manipulator with the finger modules in a spherical configuration.
Figure 4:
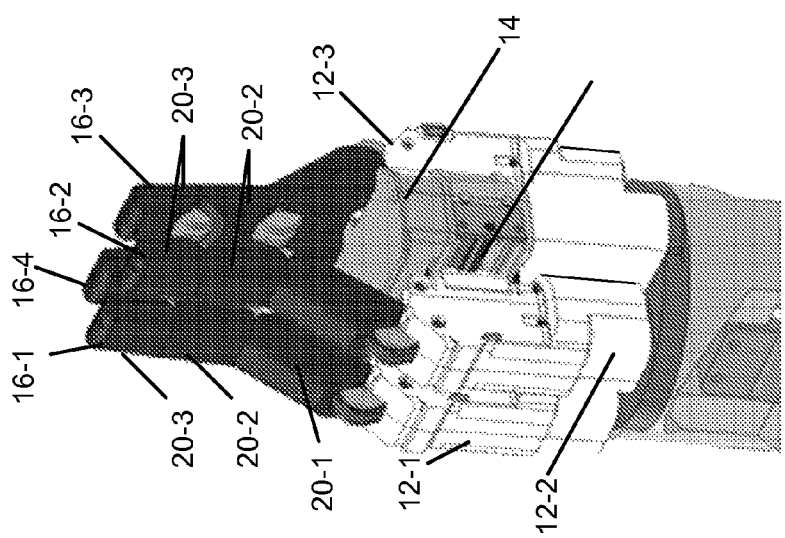
FIG. 4 is a view of an embodiment of the robotic manipulator with the finger modules in an opposed configuration.

FIG. 4, FIG. 5, and FIG. 6 show the robotic hand 10 in three different configurations. In FIG. 4, the fingers 16-1, 16-2 are directly opposed to the fingers 16-3, 16-4 (finger 16-1 being directly opposite finger 16-4; finger 16-2 being directly opposite to finger 16-3). In this configuration, the finger modules 12-1, 12-2 are together, adjacent to each other, approximately midway along the side of the palm assembly 14. The fingers 16 are bent so that the distal phalanges 20-3 and intermediate phalanges 20-2 of the fingers 16-1 and 16-4 are parallel to each other; as are the distal 20-3 and intermediate phalanges 20-2 of the fingers 16-2 and 16-3. The finger modules 12-1, 12-2 are disposed in a track 40 along which the finger modules 12-1, 12-2 can travel laterally along the side of the palm assembly 14. This lateral movement capability of the finger modules 12-1, 12-2 makes the anatomy of the robotic hand 10 dynamically reconfigurable.

In FIG. 5, the fingers 16-1, 16-2 are spatially apart from each other and arched toward the other fingers 16-3, 16-4, which arch back toward the fingers 16-1, 16-2. The arrangement produces a spherical pose among the fingers 16. In FIG. 6, the fingers 16-1, 16-2 are spatially apart from each other at opposite ends of the track 40 and bent forward. The other fingers 16-3 and 16-4, fixed in their positions on the opposite side of the palm assembly 14, are also bent forward, extending in the opposite direction of and coming in between the bent fingers 16-1 and 16-2, producing an interlaced arrangement among the fingers 16.

Figure 7:
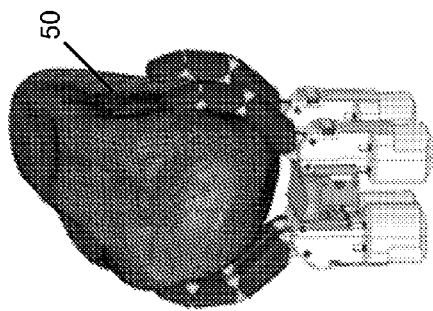
FIG. 7 is a view of an embodiment of the robotic manipulator with underactuated fingers grasping an object.
Figure 8:
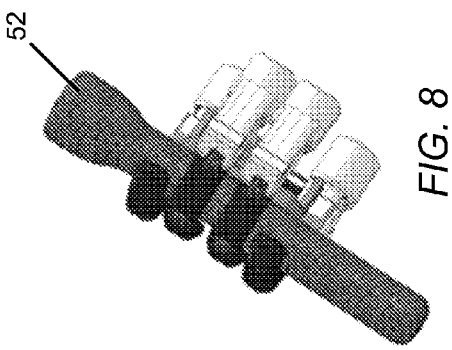
FIG. 8 is a view of an embodiment of the robotic manipulator with underactuated fingers grasping a flashlight.
Figure 9:
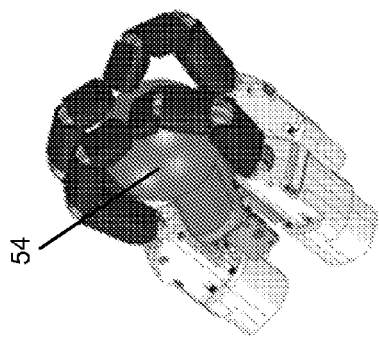
FIG. 9 is a view of the robotic manipulator with the fingers grasping a sphere.
Figure 10:
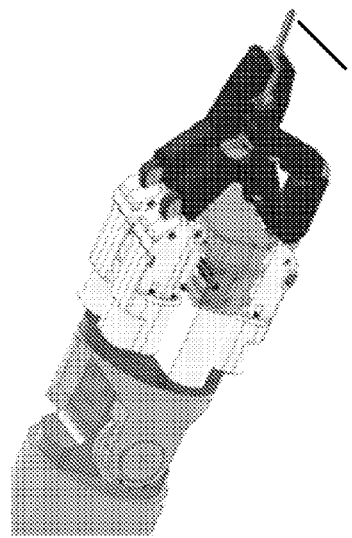
FIG. 10 is a view of an embodiment of the robotic manipulator with the fingers using a precision grasp to pinch a key.
Figure 11:
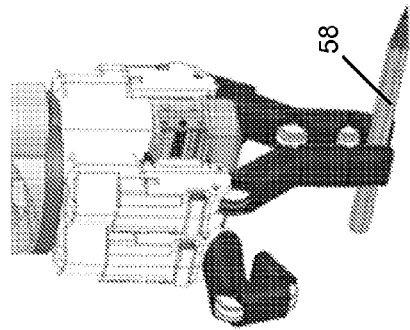
FIG. 11 is a view of an embodiment of the robotic manipulator with the fingers using a precision grasp to hold a pencil.

FIG. 7 through FIG. 11 show different grasps of which the robotic hand 10 is capable. The different grasps presented are merely illustrative examples; many other types of grasps are possible. In FIG. 7, the underactuated fingers are executing a power grasp of an irregularly shaped object 50. FIG. 8 shows the underactuated fingers in an interlaced configuration grasping a flashlight 52. FIG. 9 shows the fingers in a spherical configuration grasping a sphere 54. Two of the fingers use a power grasp to pinch a key 56 in FIG. 10, whereas, in FIG. 11, two fingers use a precision grasp to pinch a pencil 58.

FIG. 12A and FIG. 12B show the use of selective locking of the joints of two opposing fingers 16-1 and 16-4 to alter a grasp of an object 60. In FIG. 12A, with all of the joints 18-1, 18-2, 18-3 (generally, 18) unlocked, the fingers conform to the shape of the object 60, and the robotic hand 10 performs a power grasp. Initially, the fingers 16 can close about the object until a finger detects light contact with the object. When a finger detects contact, its proximal joint 18-1 can be locked, while the remaining intermediate and distal joints of the finger remain unlocked. The intermediate and distal joints can continue to flex without increasing the contact force applied to the object. Accordingly, the contact with the object causes minimal disturbance of the object. Subsequently, the intermediate joint 18-2 can be locked, for example, after contact is detected on the intermediate phalange 20-2, while the distal joint 18-3 remains unlocked. By locking the proximal and intermediate joints 18-1, 18-2, force can be transferred force to distal joint 18-3, and the finger 16 has thus progressed from being underactuated with three degrees of freedom to having a single degree of freedom. After each finger makes contact sufficient to establish a grasp of the object, all joints can be locked to stiffen the grasp, as shown in FIG. 12B.

FIG. 13 shows the use of selective locking of the joints of two opposing fingers 16-1 and 16-4 to perform a precision grasp on a spherical object 62, which is held between the fingertips. In the execution of this grasp, the proximal joints 18-1 of both fingers are unlocked, while the intermediate joints 18-2 and distal joints 18-3 of both fingers 16-1, 16-4 are locked, which effectively locks their distal phalanges 20-3.

FIG. 14 shows the use of selective locking of the joints of two opposing fingers 16-1 and 16-4 to perform a precision grasp on a flat object 64. The distal phalanges 20-3 of the opposing fingers can hyperextend to form a flat gripper, which provides a simple way of grasping small objects. To hold the object, all of the joints can be unlocked.

FIG. 15A and FIG. 15B show the use of selective locking of the joints of two opposing fingers 16-1 and 16-4 to hold, manipulate, and re-grasp an object 66. In FIG. 15A, the robotic hand has the object in a precision grasp, with the proximal joints 18-1 and intermediate joints 18-2 of both fingers being unlocked, while the distal joints 18-3 of both fingers are locked. As shown in FIG. 15B, in an attempt to rotate the object 66, the distal phalange 20-3 of the finger 16-1 pushes upwards against the object 66 and then locks its intermediate joint 18-2, momentarily holding the finger 16-1 in this present position so that the other finger 16-4 can make the next move to further the rotation. By multiplexing incremental acts of flexing, locking, unlocking, and combinations thereof, the fingers can cooperate to manipulate and re-grasp objects held by the fingers 16 of the hand 10.

FIG. 15A and FIG. 15B are just one example of how the robotic hand 10 can re-grasp an object. Numerous other techniques are possible, for instance, using three fingers to hold an object in a power grasp, while a fourth finger moves the object held in the power grasp. For example, the robotic hand 10 can use three fingers to hold a flashlight in a power grasp, and a fourth finger to rotate the flashlight to find and press its on/off button.

Figure 16:
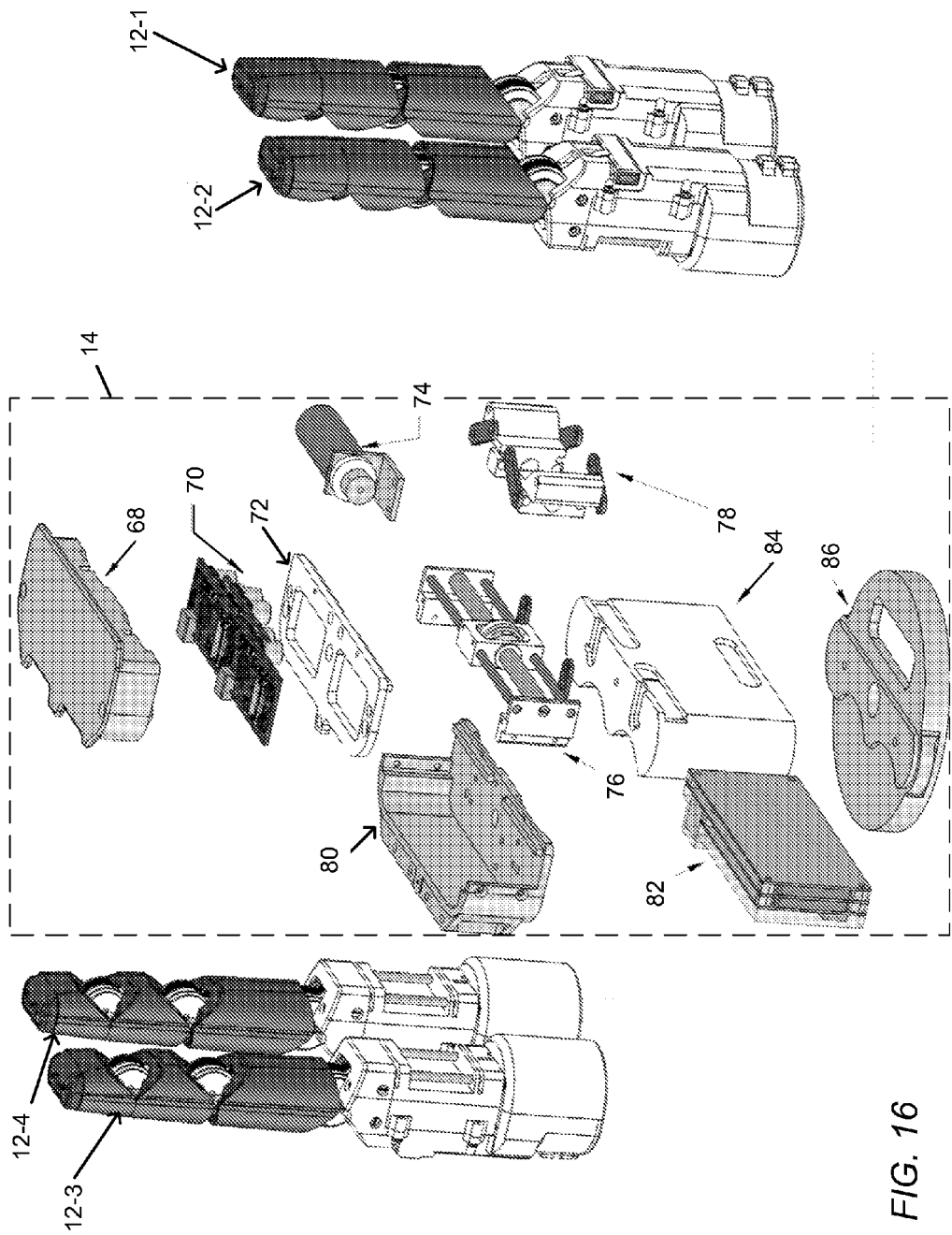
FIG. 16 is an exploded view of one embodiment of the robotic manipulator including four finger modules and a palm assembly.

FIG. 16 shows an exploded view of one embodiment of the robotic hand 10 including the four finger modules 12-1, 12-2, 12-3, 12-4 and the palm assembly 14. All finger modules 12 are modular in construction; they are interchangeable, and can either be fixed or movably coupled to the palm assembly 14. In one embodiment, the palm assembly 14 includes a palm 68, a motor-and-hand controller PCB (printed circuit board) stack 70, a divider 72, a finger-spreader motor 74, a finger-spreader actuator 76, two finger-spreader blocks 78, a finger-module mount 80, high-voltage electronics 82, a base housing 84, and an arm adapter 86.

The arm adapter 86 couples the robotic hand 10 to a robotic forearm, for example, a GFE Barrett Arm (not shown). The base housing 84 attaches to the raised surface of the arm adapter 86. The high-voltage electronics 82 are housed within the base housing 84 and distribute power to the finger modules 12, motor-and-hand controller stack 70, and finger-spreader motor 74. In particular, the high-voltage electronics 82 include multiple switchable channels of high voltage (±1 kV) used to selectively lock and unlock joints 18, as described in more detail below.

The finger-spreader actuator 76 mounts to the open side of the finger module mount 80, and the finger module mount 80 connects to the top surface of the base housing 84. The finger-spreader motor 74 resides within a compartment defined by the side wall of the finger module mount 80 and the finger-spreader actuator 76. The finger-spreader motor 74 is operably coupled to move the finger-spreader actuator 76. The finger modules 12-3, 12-4 attach to the exterior of the side wall of finger module mount 80. Each finger-spreader block 78 couples one of the other finger modules 12-1, 12-2 to the finger-spreader actuator 76.

The palm 68 houses the motor-and-hand controller stack 70 and attaches to the top of the finger-module mount 80, the divider 72 serving as a gasket between the palm 68 and finger-module mount 80. The motor-and-hand controller stack 70 controls operation of the finger-spreader motor 74 in response to control commands, and interfaces with the finger modules 12 and the high-voltage electronics 82. Control signals sent from the motor-and-hand controller stack 70 to the high-voltage electronics 82 control the use of electroadhesion in the skin of the fingers and switch high voltage (e.g., +1 kV; −1 kV) among the electrolaminate brakes used to selectively lock and unlock the finger joints 18.

Figure 17:
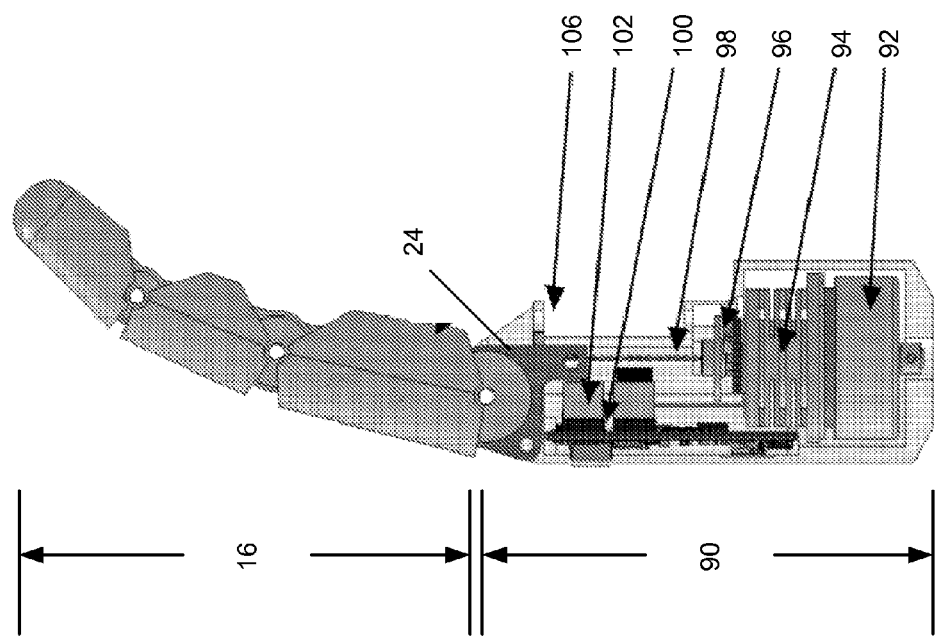
FIG. 17 is a side view of an embodiment of a finger module including a finger assembly mounted to an actuator module.

FIG. 17 shows an embodiment of a finger module 12 including the finger assembly 16 mounted to an actuator module 90. The actuator module 90 provides a backdriveable, twisted-string transmission with built-in compliance and low backlash. Although shown to be integrated into the finger module 12, in other embodiments, the twisted-string transmission of the actuator module 90 can be implemented in or mounted on a forearm connected to the robotic hand 10.

The actuator module 90 houses a motor 92, a machined spring 94, a motor encoder 96, a twisted string 98, a Hall Effect sensor 100, and a sensor circuit board 102 with a controller (e.g., 80 MIPS DSP). The motor 92 is, in one embodiment, a brushless DC motor (e.g., 15 W) with a high gear ratio (i.e., greater than 50:1). The motor encoder 96 tracks the position of the motor 92. The twisted string 98 is coupled by the finger mount 24 to the drive tendon 130. The twisted string 98 can be a KEVLAR, Spectra, or Vectran cable. The Hall Effect sensor 100 measures compression of the twisted string 98 to provide a force feedback signal, and the controller and sensor board 102 includes a force/current sensor that can measure actuator torque.

In brief overview, the actuator module 90 translates rotary motion of the motor 92 to linear motion of a tendon 130 (FIG. 22) within the finger 16. The motor 92 twists the twisted string 98. Twisting motion in one direction causes the length of the twisted string 98 to shorten, which causes a pull of the tendon 130 through the finger, causing the finger to actuate. The finger 16 flexes accordingly depending on which joints are locked and unlocked. Twisting in the other direction releases compression on the twisted string 98; and the spring return 140 (FIG. 24) urges the finger 16 to extend in a manner depending on which joints are presently locked and unlocked.

With a backdriveable transmission, the actuator module 90 can be responsive to external disturbances and maintain the force exerted on the finger below a certain level. If active force control is used to backdrive the transmission, sensors measure external forces exerted on the finger 16, and provide feedback. In response to this feedback, the actuator module 90 actively causes the motor 92 to move the finger in a manner as though the external forces were pushing the finger. Thus, the finger does not wholly resist the external forces, but moves with them. Alternatively, the transmission can be passively backdriveable without a sensor or a closed feedback loop buy using a low gear ratio (below 1:50) and having high efficiency.

Figure 18:
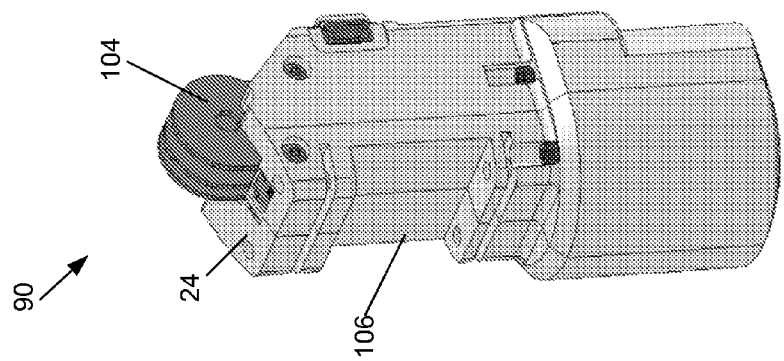
FIG. 18 is a view of an embodiment of the actuator module of FIG. 17.

FIG. 18 shows an embodiment of the actuator module 90 of FIG. 17. The actuator module 90 has disc-shaped plates 104 that interleave with and couple to plates of a finger assembly 16, to form the proximal joint 18-1 (FIG. 1) of the finger assembly 16. One side of the actuator module 90 has a notch 106 adapted to mount to one side of the palm assembly 14 (either to a rail on the side wall of the finger module mount 80 (FIG. 16) or to the finger-spreader blocks 78 (FIG. 16)).

FIG. 19 shows an exploded view of one embodiment of a finger module 12 including the finger assembly 16 and the actuator module 90 (exploded into three pieces: a plastic housing 90A, a palm assembly mount 90B with the notch 106, and a cover 90C). Also shown are the motor 92, the machined spring 94, the motor encoder 96, the sensor board 102, a forced-sensor assembly 110, and a twisted string assembly 112 with the twisted string 98. In addition, a flat flex electrical circuit 114 extends from the actuator module 90 to the proximal joint 18-1. The flex circuit 114 contains the communication bus for the position and tactile sensors in the fingers.

Figure 20:
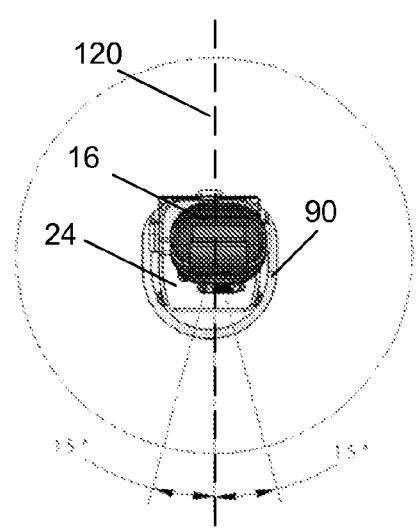
FIG. 20 is a diagram illustrating an example of a measure of rotational compliance of the finger assembly.
Figure 21:
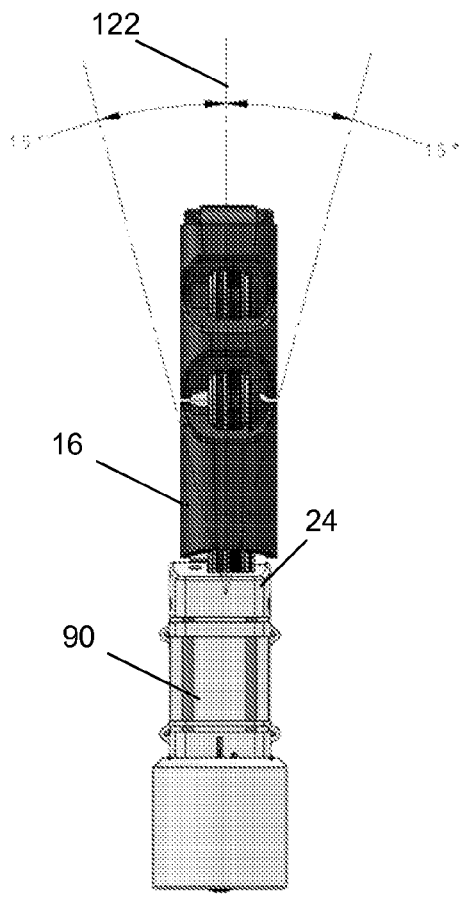
FIG. 21 is a diagram illustrating an example of a measure of lateral compliance of the finger assembly.

FIG. 20 and FIG. 21 show examples of mechanical compliance provided by the finger mount 24 used to join the finger assembly 16 to the actuator module 90. FIG. 20 shows to what degree the finger assembly 16 can be twisted relative to the actuator module 90. In this example, the finger module 20 is designed for ±15 degrees of twisting with respect to axis 120. FIG. 21 shows a measure of lateral compliance of the finger assembly 16 relative to the actuator module 90. Measured with respect to the axis 122, the finger assembly can tilt ±15 degrees. A flexure feature in the proximal joint 18-1 in the finger mount 24 at the base of the finger assembly 16 provides the rotational compliance. When an object is grasped with multiple fingers, the rotational and lateral compliance of the fingers can ensure that the fingers passively align and balance the normal forces exerted on the object.

Figure 22:
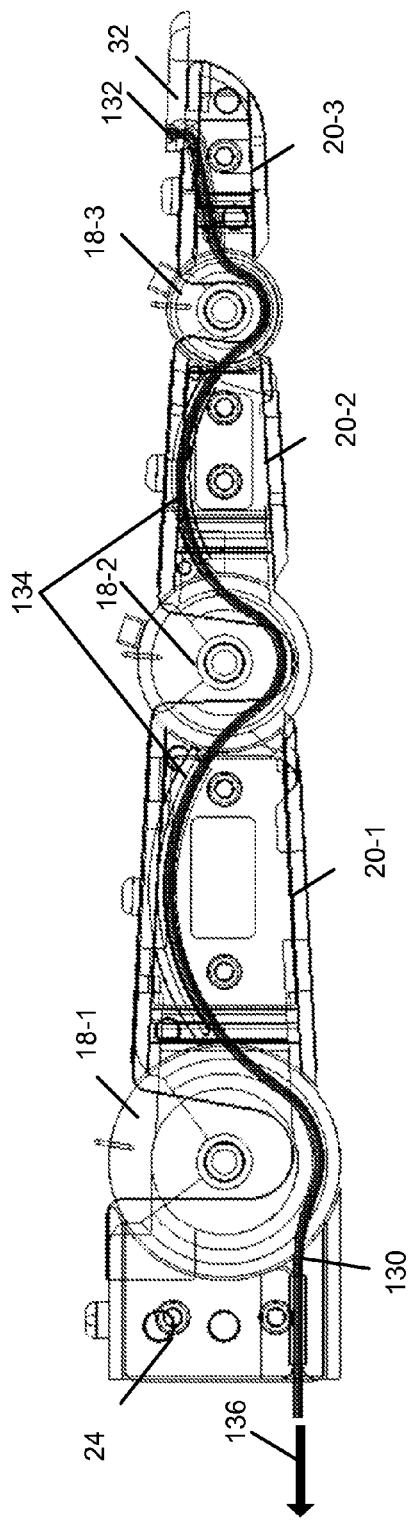
FIG. 22 and FIG. 23 are opposite side views of an embodiment of a finger assembly.
Figure 23:
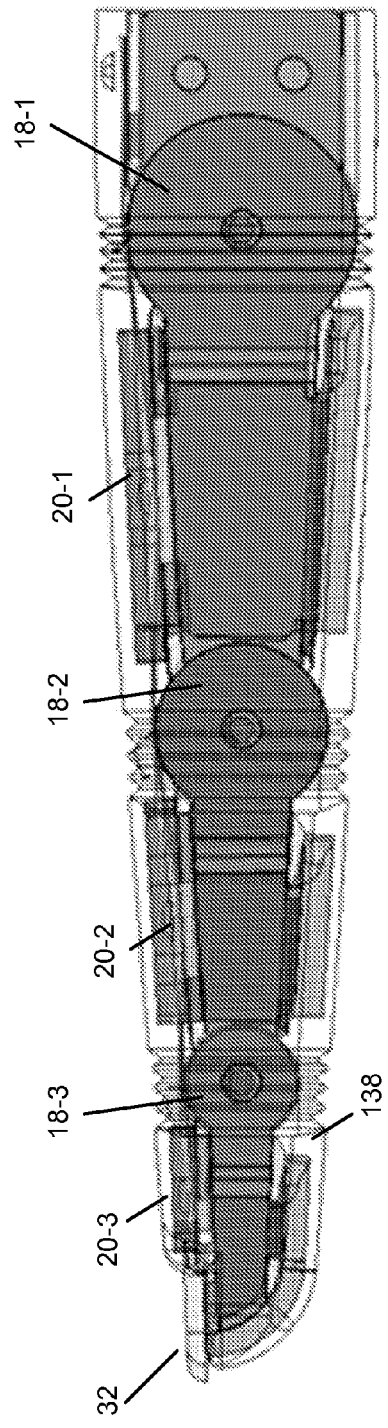

FIG. 22 and FIG. 23 show opposite side views of an embodiment of the finger assembly 16. In FIG. 22, the finger assembly 16 includes a single cable (referred to as the tendon) 130 extending the length of the finger assembly. The tendon 130 runs from the finger mount 24 (not shown), routes around each joint 18-1, 18-2, 18-3, passes through each phalange 20-1, 20-2, and 20-3, and terminates near the fingertip 32 at an anchor point 132, to which the tendon 130 is fixed. The route of the tendon 130 through the finger 16 around the joints 18 and phalanges 20 runs tangent to pulley surfaces and passes through arcuate channels 134; the route is smooth, having no sharp corners. To bend the finger 16, force is applied to the tendon 130 in the direction indicated by arrow 136. The shape assumed by the finger 16 in response to the applied force depends on which joints 18 are locked and unlocked (and on any object currently in the grasp). FIG. 23 shows the side of the finger 16 opposite the tendon 130. In FIG. 23, the finger 16 has a thin protective outer skin 138, with accordion-like folds at the joints 18 to allow for bending.

Figure 24:
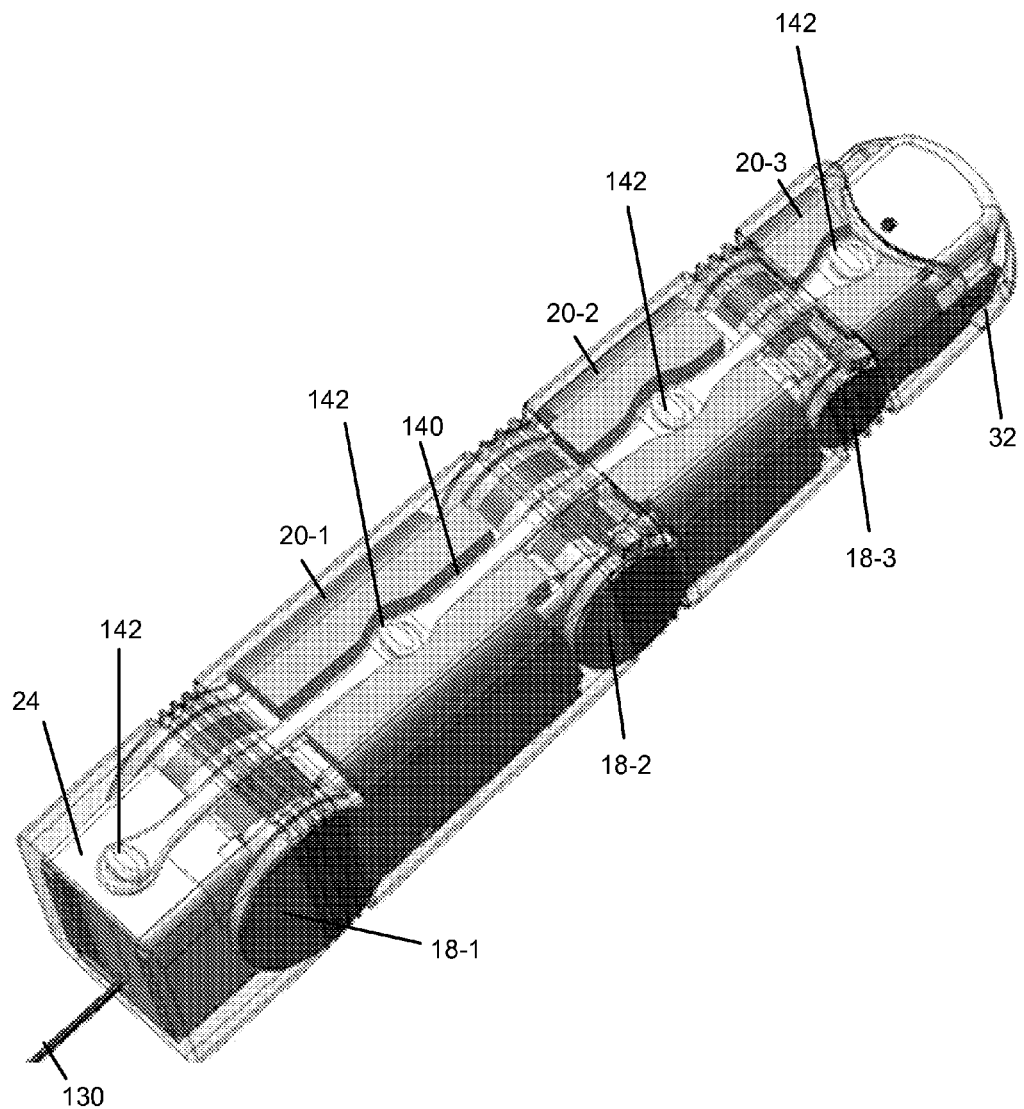
FIG. 24 is a bottom view of the embodiment of the finger assembly of FIG. 22 and FIG. 23.

FIG. 24 shows a bottom view of the embodiment of the finger assembly 16 with a spring return 140 extending from the finger mount 24 to the distal phalange 20-3. The spring return 140 couples to the finger mount 24 and to each phalange 20-1, 20-2, and 20-3 at anchor points 142. The spring return 140 generally opposes the tendon 130 and urges the finger 16 to extend (straighten). Although a single tendon is being used to flex the finger, with a spring return 140 to urge the finger 16 back to its extended position, other embodiments can omit the spring return and use a single tendon in a loop configuration around the pulleys, or use multiple tendons.

Figure 25:
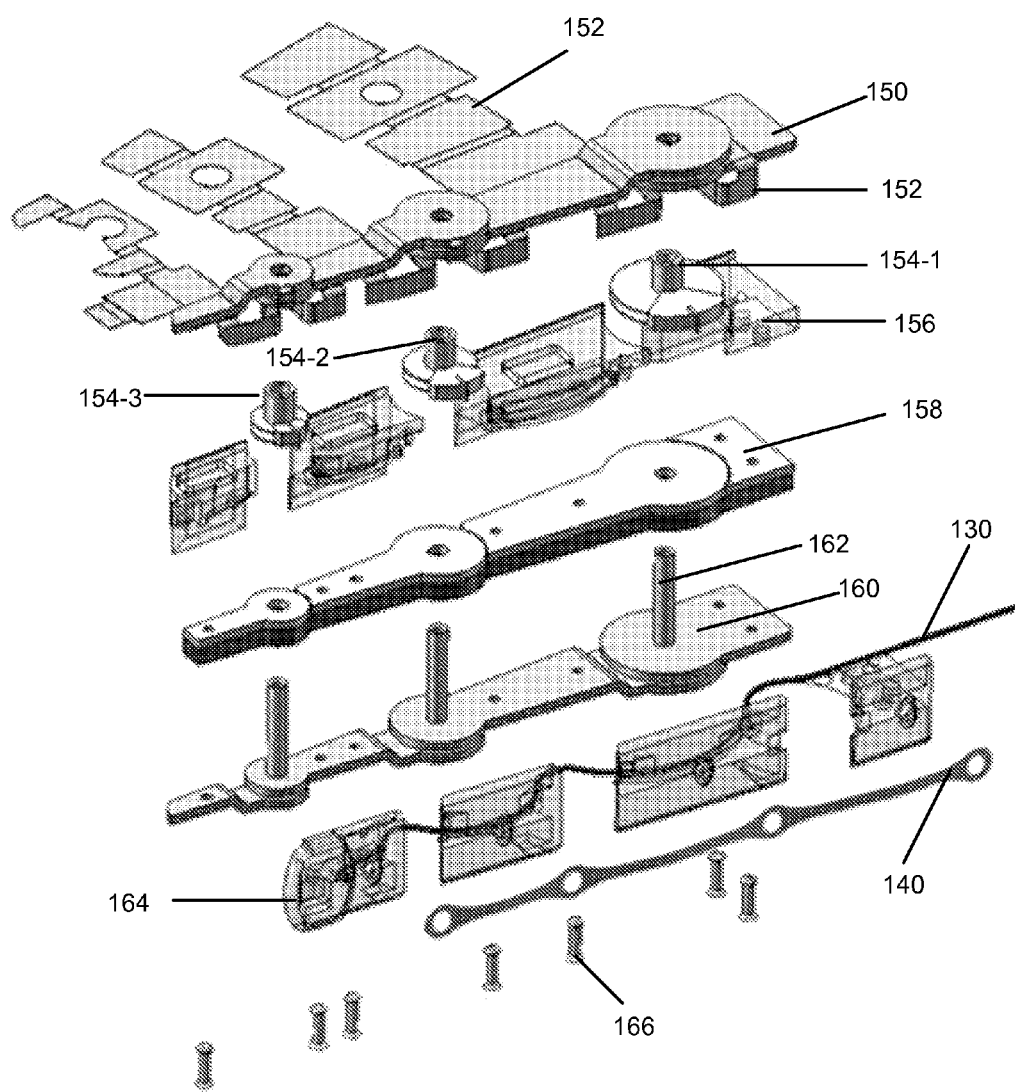
FIG. 25 is an exploded view of one embodiment of the finger assembly.

FIG. 25 shows an exploded view of one embodiment of various components in the finger assembly 16. The components include a stamped sheet metal skeleton 150, a flex circuit 152 pre-bonded to the skeleton 150, injection molded cable pulleys 154-1, 154-2, and 154-3 (generally, 154), a first portion of an injection molded core 156, a brake subsystem 158, a stamped sheet metal skeleton 160 with hollow pins 162, a second portion of the injection molded core 164 with the tendon 130 pre-inserted, the elastic spring return 140, and rivets 166.

When the finger 16 is fully assembled, the flex circuit 152 folds around each phalange 20. The tendon 130 runs over the cable pulleys 154. The two portions of the injection molded core 156, 164 attach to each other to contain the tendon 130. The spring return 140 attaches to anchor points 142 of the exterior side of the second portion of the injection molded core 164.

The brake subsystem 158 provides the ability to lock and unlock joints. The brake subsystem 158 is shown here as a pre-assembled unit. Alternatively, the brake subsystem 158 can be assembled on the skeleton. The hollow pins 162 extend through openings in the brake subsystem 158, the pulleys 154, and skeleton 150. The ends of the hollow pins 162 are flared to secure the assembly. The rivets 166 secure the skeleton 160 to the brake subsystem 158.

Figure 26:
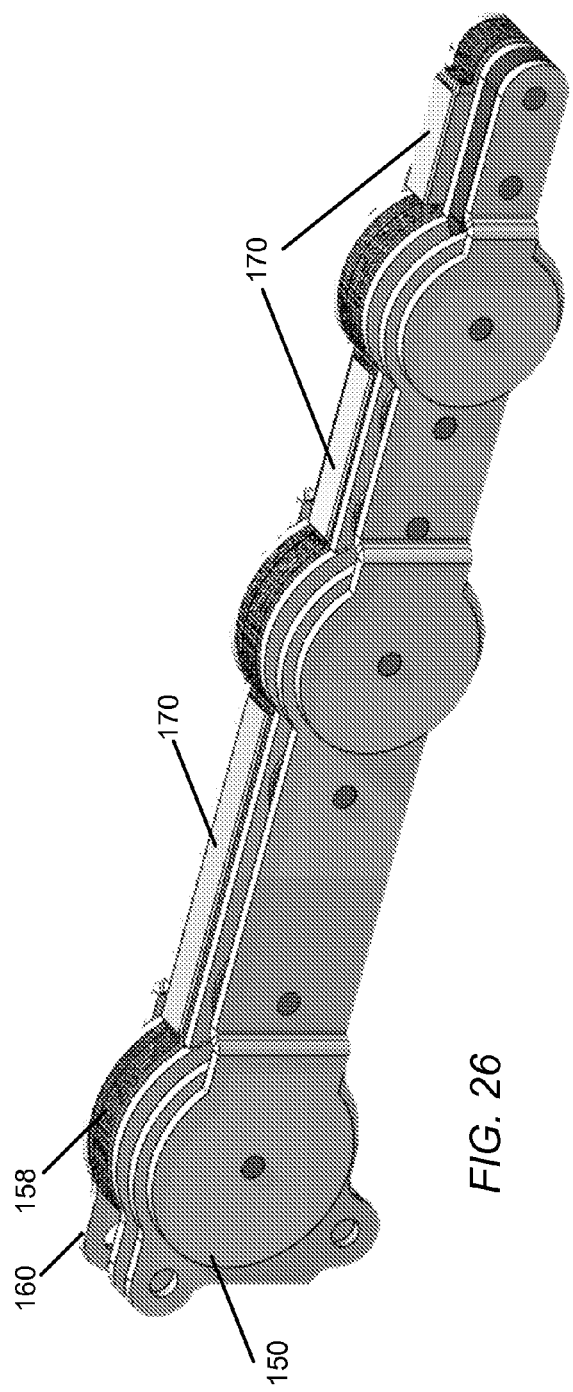
FIG. 26 is an isometric view of one embodiment of the internal structure of the finger assembly.
Figure 27:
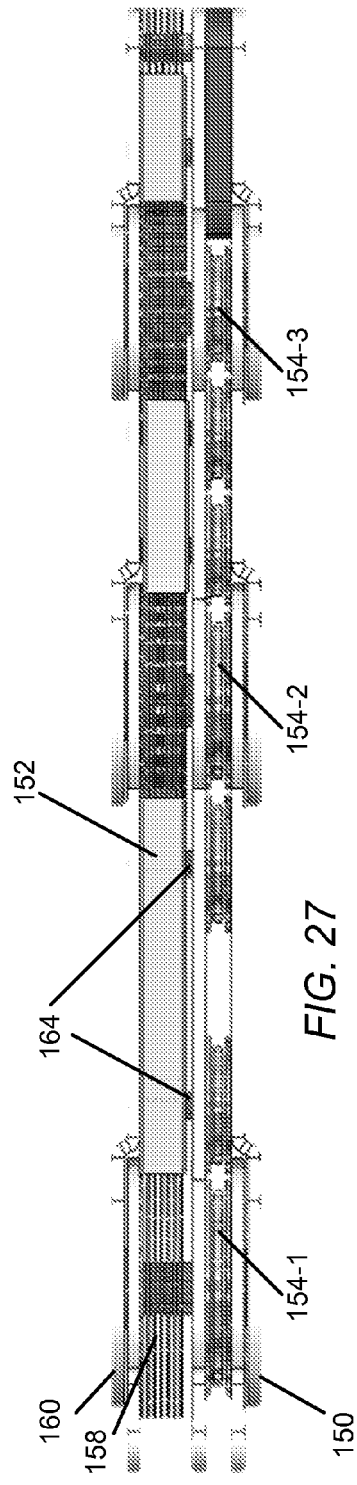
FIG. 27 is an edge view of the internal structure of the finger assembly.

FIG. 26 shows an isometric view and FIG. 27 shows an edge view of the internal structure of the finger 16 after assembly. The multi-layer internal structure includes the brake subsystem 158 sandwiched between the two sheet metal skeletons 150, 160. Segments of the brake subsystem 158 are wrapped in a shielding layer 170. The shielding layer 170 shields sensors (i.e., in the flex circuit 152) from possible interference from the high-voltage locking and unlocking actuation of the joints 18.

Figure 28:
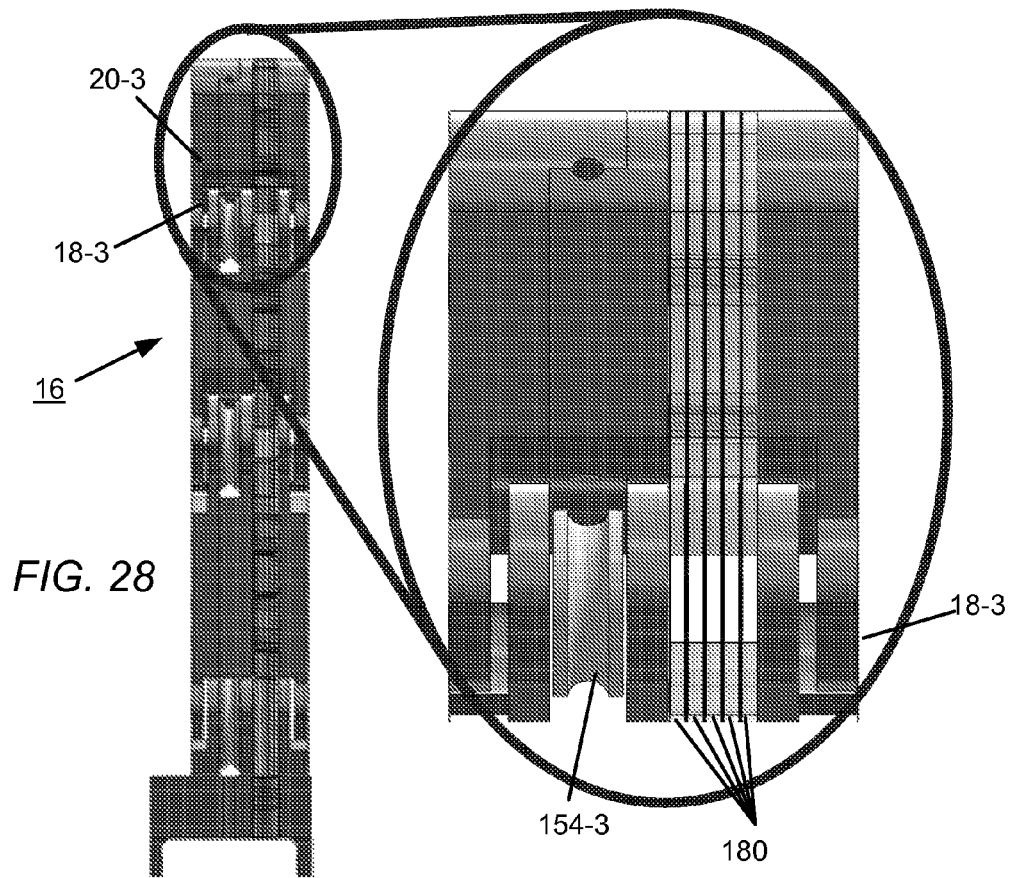
FIG. 28 is a side view of an embodiment of the finger assembly with its distal joint shown in detail.

FIG. 28 shows an example of the finger assembly 16, with its distal joint 18-3 shown in detail. The distal joint 18-3 includes the cable pulley 154-3 and a multilayered composite structure 180 made of electrolaminate materials. In general, electrolaminates change from compliant and spring-like to essentially rigid, using electrostatic clamping to control the connectivity between different materials in the layered composite structure. The electrolaminate structure can withstand slip under pressure. The maximum force that the composite electrolaminate structure 180 can withstand is a function of the properties of the clamping surfaces, the applied voltage, and the total clamping area. Typical maximum clamping pressures are about 0.4 Mpa (70 psi).

Figure 31A:
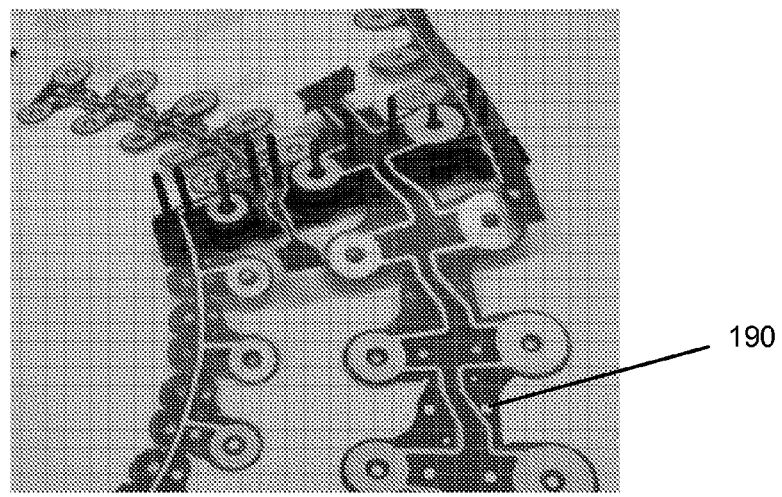
FIG. 31A-FIG. 31G are pictorial illustrations of example steps of the assembly process described in FIG. 30.

The multilayered composite electrolaminate structure 180 can be fabricated as a monolithic sheet 190 (FIG. 31A) with individual attachment points to each joint (or set of joints) that can be locked. The multilayered composite electrolaminate structure 180 includes passive (voltage-off) compliant elements that operate to oppose the actuator tendon 130 and provide an extensional force for each joint 18. The multilayered composite electrolaminate structure 180 can be shielded by locating the ground planes on the outermost electrodes, or by encircling the electrolaminate structure 180 in a conductive elastomeric sheath.

Figure 29:
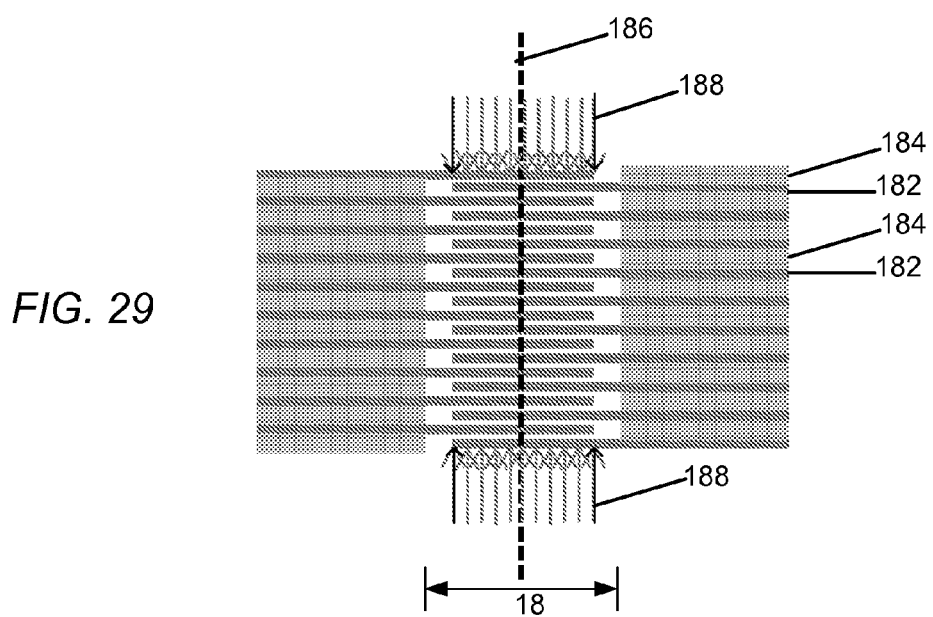
FIG. 29 is a diagrammatic view of an embodiment of a multilayer electrolaminate structure.

FIG. 29 shows a diagrammatic representation of a multilayer electrolaminate structure 180 to illustrate the stiffening operation of a joint 18. The multilayer electrolaminate structure 180 includes a plurality of brake layers 182 interleaved with spacer layers 184. The joint 18 rotates about axis 186. In response to an electrical signal (i.e., high voltage) to lock this joint 18, the pressure distribution on the multilayer structure 180 occurs on both sides of the structure as illustrated by arrows 188. Rather than concatenate segments of the multilayer electrolaminate structure 180 end-to-end, the multilayer electrolaminate structures 180 can be overlapped at the joint 18 to allow individual joint locking. Each segment of multilayer electrolaminate structure 180 is independently drivable; locking can be applied to the distal joint only, to the intermediate joint only, to the proximal joint only, to any two joints concurrently, or to all joints concurrently.

The multilayer electrolaminate structure 180 generates pressure through electrostatics, and is capable of producing high locking torques (e.g., approximately 4-12 lb-in for an electrolaminate stiffener having 5 layers, a 0.25 to 0.50 inch diameter, and 0.25 inch total thickness, and weighing 2.5 g). Power consumption can be less than a tenth of a Watt (e.g., 0.06). All forces are internal; hence the brake subsystem 158 does not require an external rigid structure to apply the braking force. After the applied voltage is removed, the multilayer electrolaminate structure 180 releases its grip in approximately 10 ms to 500 ms. The release time can determine how quickly one can multiplex locking and unlocking among the joints 18 of a finger 16.

Figure 30:
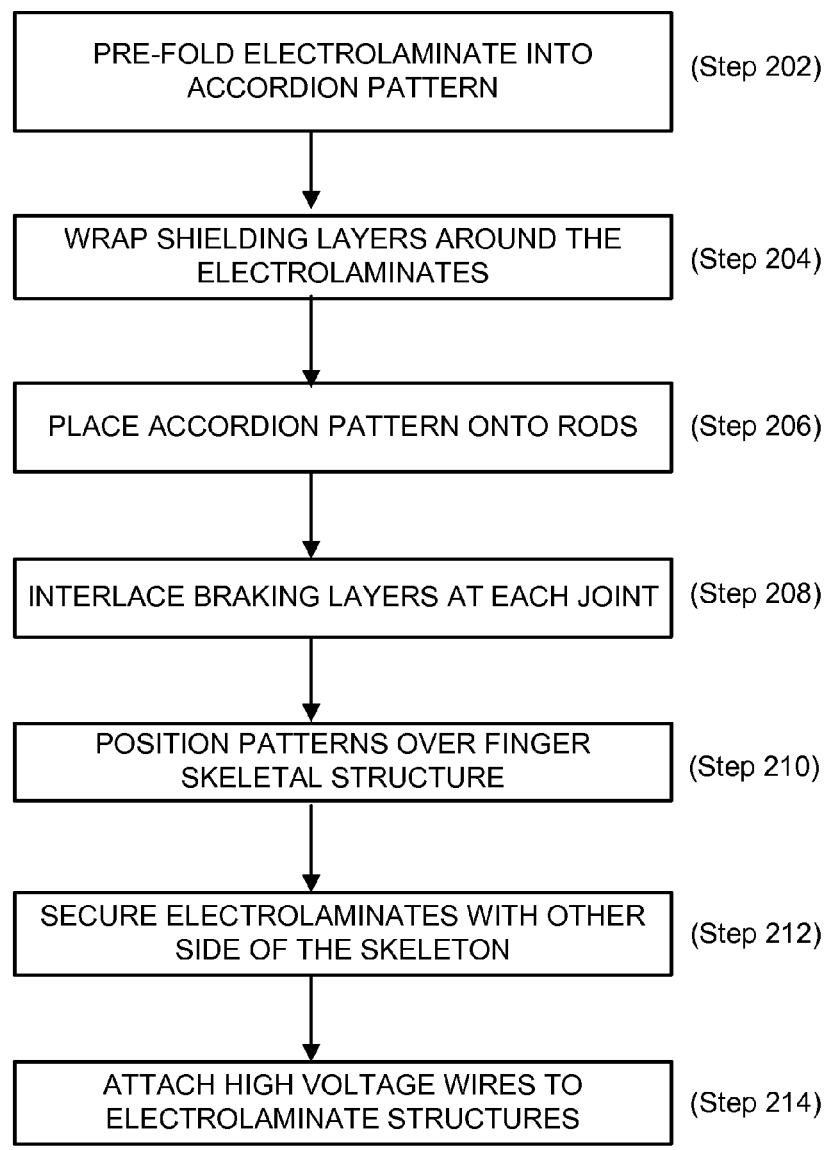
FIG. 30 is a flow diagram of an embodiment of a process for assembling a brake subsystem of the finger assembly.
Figure 31B:
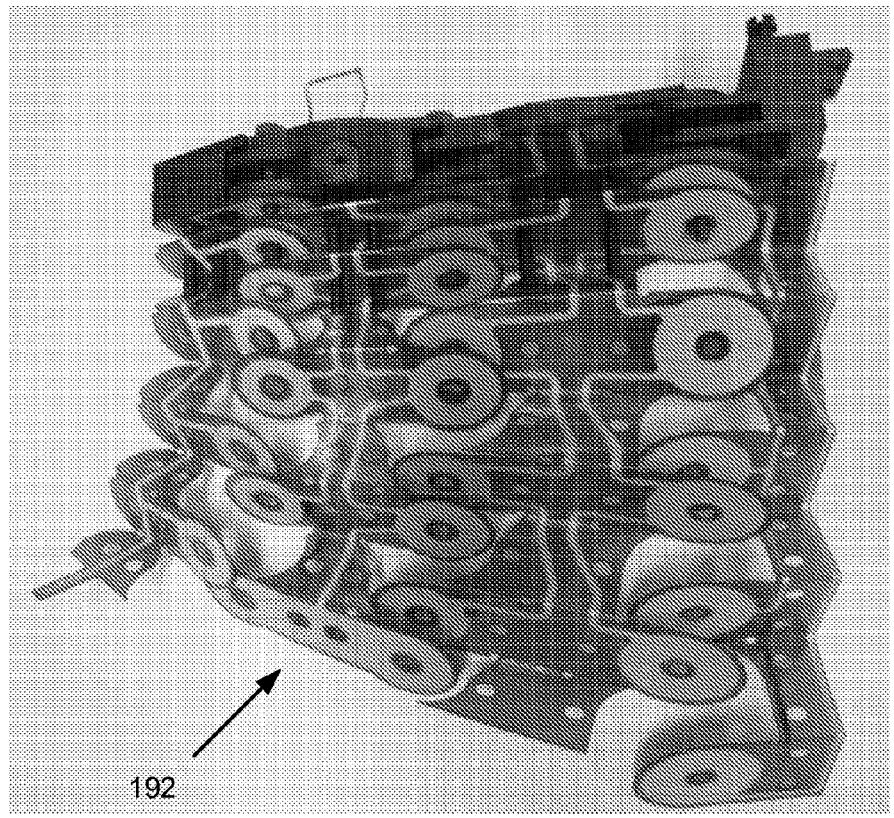
Figure 31C:
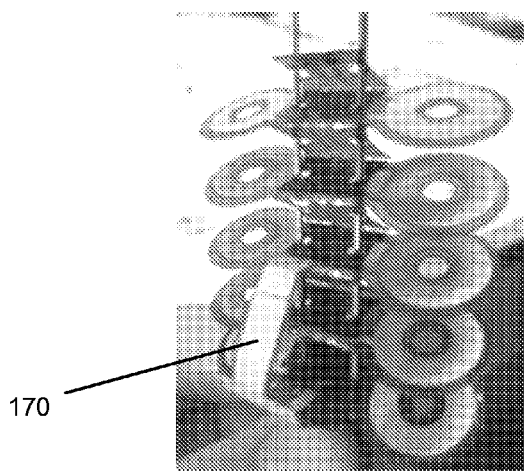
Figure 31D:
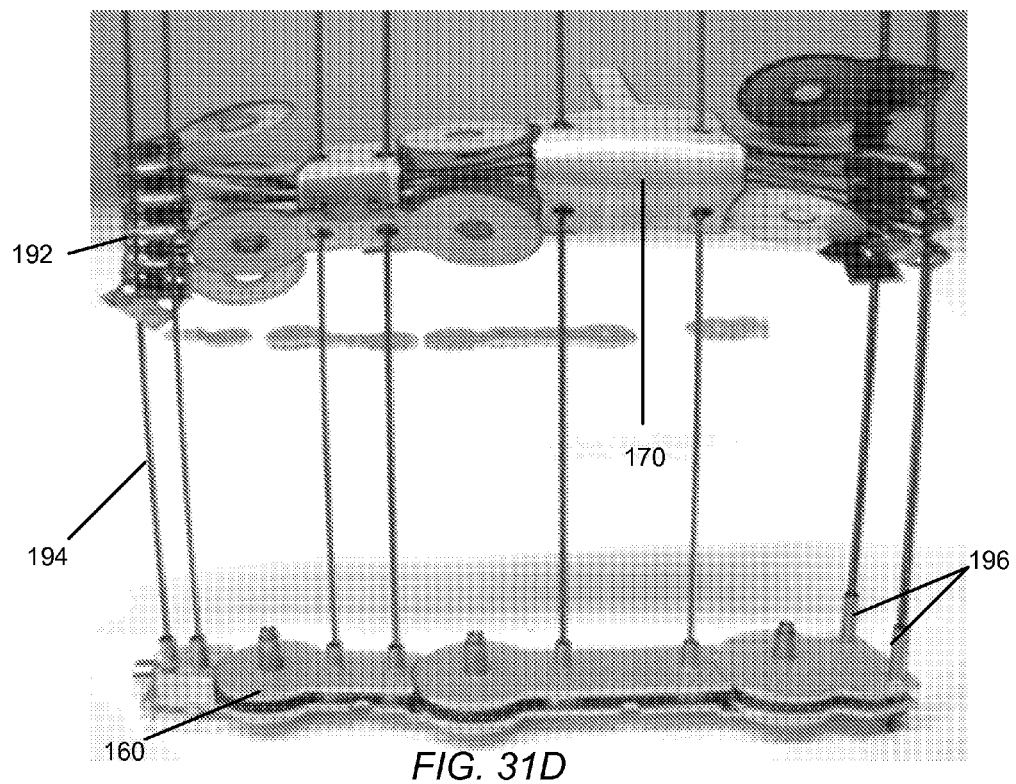
Figure 31E:
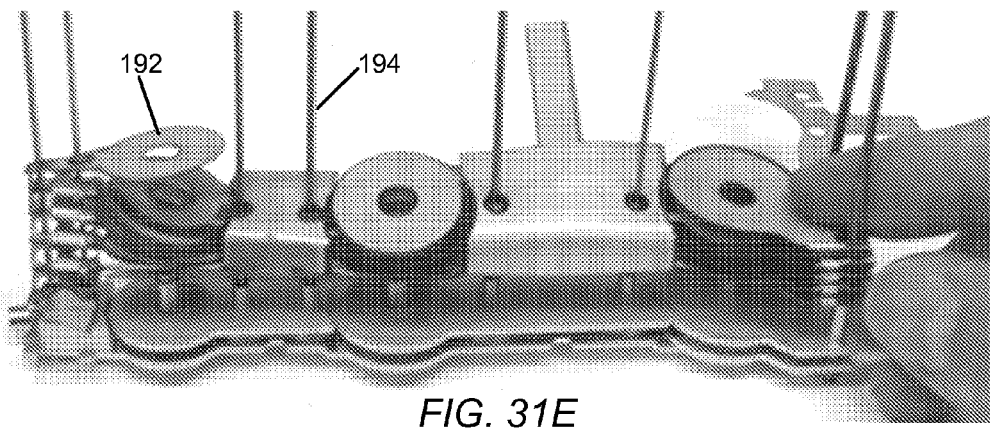
Figure 31F:
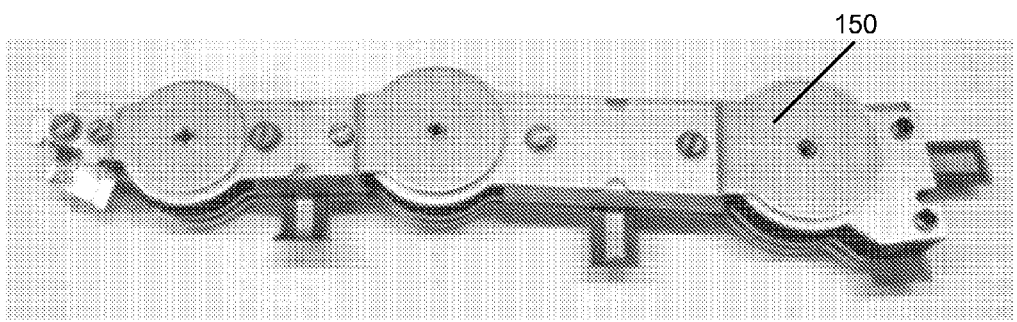
Figure 31G:
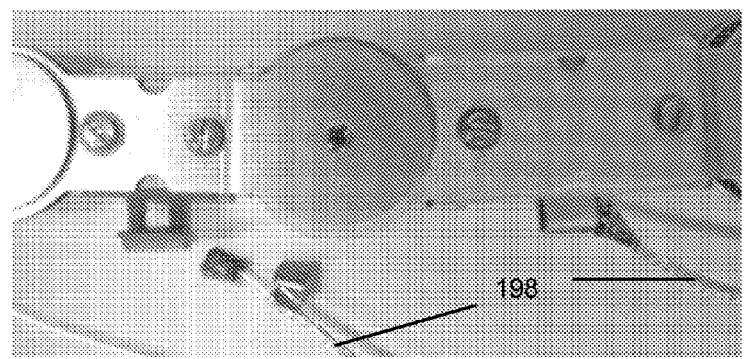

FIG. 30 shows a flow diagram of an embodiment of a process 200 for assembling the brake subsystem 158 of the finger assembly 16. In the description of the process 200, reference is made to FIGS. 31A-31G to provide pictorial illustrations of some of the steps of the process 200. At step 202, an electrolaminate sheet 190 (FIG. 31A) is pre-folded into an accordion pattern 192 (FIG. 31B). Shielding layers 170 (FIG. 31C) are wrapped (step 204) around the electrolaminates. The accordion pattern 192 is placed (step 206) onto rods 194 (FIG. 31D), the rods 194 aligning with mounting features 196 on the finger skeleton 160. The brake layers 182 are interlaced (step 208) at each joint 18 and the accordion pattern 192 is lowered (step 210) onto the skeleton. The electrolaminates are secured (step 212) with the other side of the skeleton 150. High voltage wires 198 are attached (step 214) to the electrolaminates, to carry a voltage to each joint 18 that causes the corresponding multilayer electrolaminate structure of that joint to stiffen.

Figure 32:
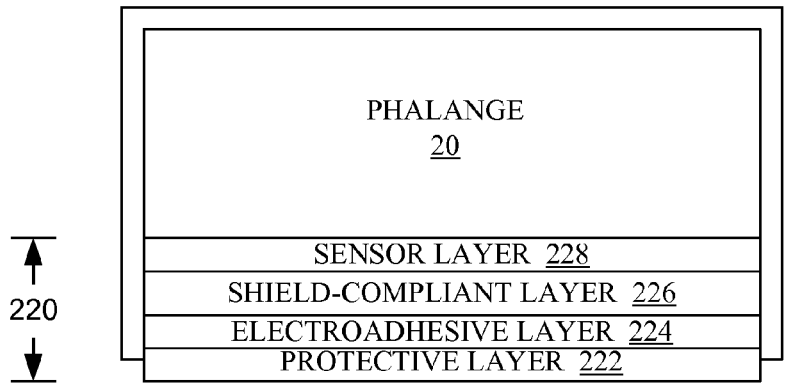
FIG. 32 is a diagrammatic representation of a multilayer skin covering a phalange of the finger assembly.

FIG. 32 shows a representation of the multilayer skin 220 covering a phalange 20 of the finger assembly 16. The multilayer skin 220 includes a protective outer layer 222, an electroadhesive layer 224, a shield-compliant layer 226, and a sensor layer 228. The protective outer layer 222 wraps around the finger 16 to protect its internal components from external elements, such as dust, moisture, and chemicals. The protective outer layer 222 is made of a compliant and abrasion-resistant material, for example, polyurethane or latex. The material provides high friction, tear resistance, stretchability, and overall durability. The protective outer layer 222 is replaceable should it become worn from use.

The electroadhesive (EA) layer 224 is an electrically controllable skin layer capable of adhering to many materials surfaces, producing the effect of variable skin friction. This friction can assist in gripping objects to overcome slippage and enhance grasping capability. The EA layer 224 enables grasping objects of various sizes, with lower grasping forces, by controlling traction and sliding. The EA layer 224 can clamp on many types of materials, including, but not limited to, glass, wood, metal, concrete, drywall, brick, and granite. The clamping forces vary with the material. In addition, the EA layer 224 consumes almost no power (e.g., 0.02 mW/N of weight supported). The EA layer 224 can be detachable without affecting the mechanical grasping capabilities of the finger. The detachability enables use of the EA layer 224 whenever the EA layer 224 is appropriate for the task.

Figure 33:
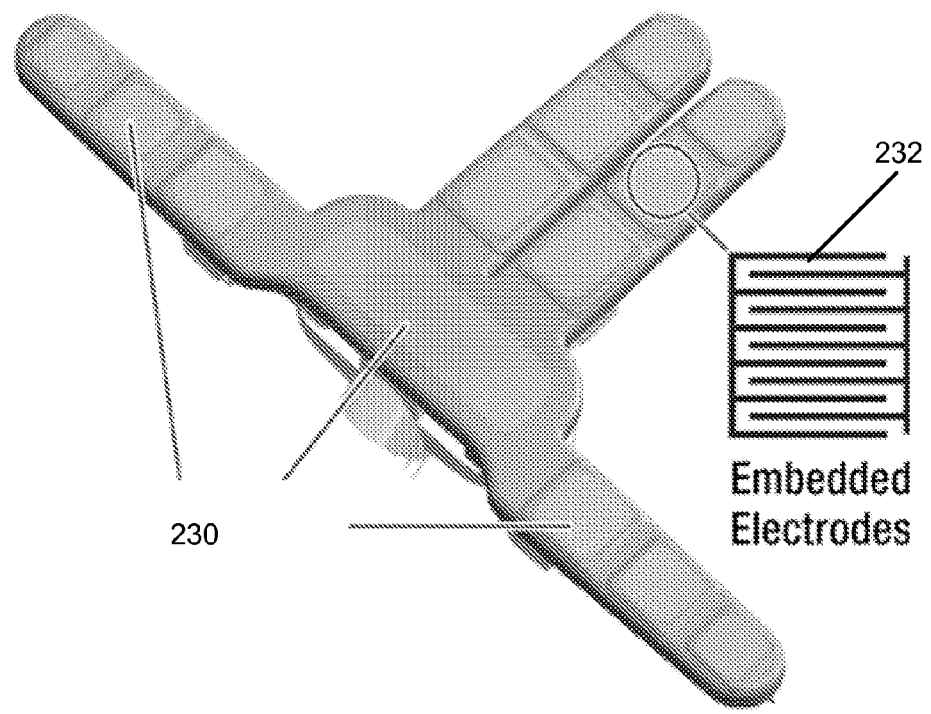
FIG. 33 is a diagram of an embodiment of a skin layer comprised of electroadhesive pads and embedded electrodes.

In one embodiment, the EA layer 224 is implemented with electroadhesive pads 230 (FIG. 33) with embedded electrodes 232 (FIG. 33). The EA layer 224 can be fabricated with a polymer, using a deposition technique, such as spray patterning. The electrode pattern can be fabricated from silicone or vulcanized rubber. A thin layer of abrasion-resistant polymer is deposited over the patterned electrodes to embed the electrodes. Although shown in FIG. 33 to be implemented on the phalanges of the fingers and on the palm, the EA layer 224 can also be folded into the joints.

High voltage (low current) applied to the electrodes induces electrostatic charges on the skin surface, which introduces anti-slip forces along an object surface. These anti-slip forces (or shear or traction forces) are decoupled from normal forces, enabling independent control of the normal and shear forces. This independent control is particularly advantageous for purposes of re-grasping an object. The selective modulation and enhancement of the skin friction (without the need for high grasping forces and tolerances) can be used in cooperation with object manipulations. Electroadhesion is described in more detail in U.S. Pat. No. 7,553,363, U.S. application Ser. No. 12/830,239, and U.S. application Ser. No. 12/762,260, the entireties of which are incorporated by reference herein.

The shield-compliant layer 226 is an electrically conducting layer integrated into one side of the EA layer 224 to mitigate interference with the various sensors of the tactile sensor layer 228 by the operation of the EA layer 224.

The sensor layer 228 is comprised of a sensor assembly of tactile pressure sensors, vibrotactile sensors, and finger-joint position sensors for sensing contact pressures, slippage, and vibration at fingertips. Other types of sensors can be integrated into the sensor layer, including but not limited to shear sensors and temperature sensors. In one embodiment, the sensor layer is integrated into a single flex circuit board (e.g., flex circuit 152 of FIG. 25) that conforms to the grasping surfaces of the finger 16. For sensing contact and sliding, the fingertip 32 has an accelerometer.

Figure 34:
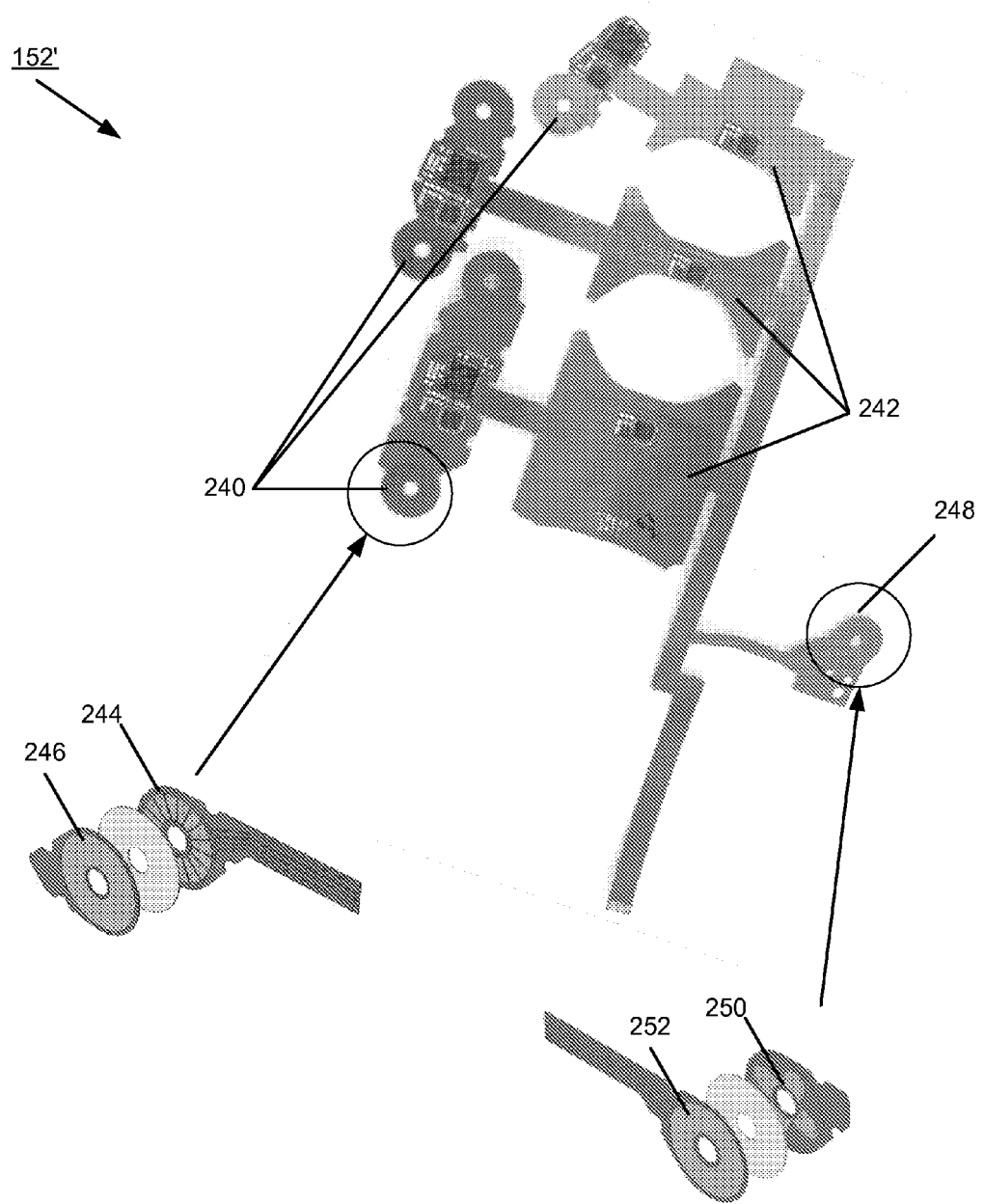
FIG. 34 is an image of an embodiment of a sensor assembly integrated into a single flex circuit board.

FIG. 34 shows an embodiment of a sensor assembly integrated into a single flex circuit board 152' (the prime (') here signifying an alternative embodiment of the flex circuit 152 shown in FIG. 25). Each finger 16 has the flex circuit board 152', which extends to all finger joints 18 and phalanges 20. Position sensors 240 and tactile (pressure) sensors 242 are printed onto the flex circuit board 152. The position sensors 240 are embedded in the joints 18; the tactile sensors 242 are on the phalanges 20. Types of position sensors include, but are not limited to, capacitive sensors, Hall-Effect sensors, inductive sensors, and potentiometers. Preferably, the position sensor 240 includes a rotary capacitive sensor array 244, as shown in FIG. 34, with a built-in shield layer 246. The shield layer 246 mitigates interference from the operation of the brake subsystem 158 on the performance of the position sensor 240.

The flex circuit board 152' can further include a position sensor 248 having a sensor array 250 and built-in shield 252. The sensor 248 provides the position of each joint.

Figure 35:
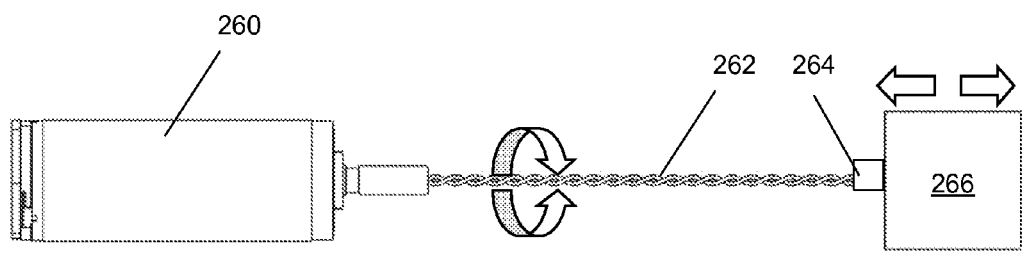
FIG. 35 is a diagram illustrating a conventional twisted-string actuator.

FIG. 35 shows a diagram generally illustrating a conventional twisted-string actuator 260, in which two cords 262 twist about one another, or about a core, to form a helical section that shortens as the input (motor) is rotated. One end of this pair of cords 262 is attached to the input rotating shaft (from a motor) and the other end is connected to a sliding mechanism 264 that prevents this other end from twisting. This sliding component 264 is then attached to the output 266 of the actuator 260, for example, a tendon or other similar linear output. The length of cord 262 between the sliding and rotating ends of the twisting section is fixed and prescribed by the designer.

Figure 36:
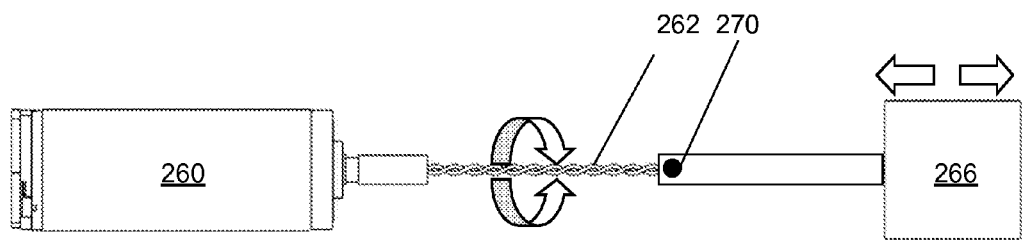
FIG. 36 is a diagram illustrating a twisted string actuator with a pin or pulley.

In FIG. 36, the sliding component 264 is eliminated and, in its place, a fixed pin 270 or pulley is used. The distance between the rotating input shaft (of the motor) and the pin 270 is constant and fixed by the designer. As the actuator input (motor) 260 is rotated, the cords 262 between the actuator input 260 and the fixed pin 270 twist, shortening and pulling additional untwisted string past the fixed pin or pulley into the twisted region. In this manner, the length of the string that is twisted is no longer fixed, but increases as the actuator input shaft rotates. Because a greater length of cord is available to be twisted, a greater number of twists can be supported before exceeding the limit of the critical helix angle, given by Alpha-max=arctan(number of cordsxradius of cord/ pixradius of helix), after which knotting occurs. For a two-cord actuator, this critical helix angle is about 32.5 degrees, where a 90-degree helix angle describes an untwisted actuator. The use of the pin 270 (or pulley) increases the effective stroke of the actuator, allowing the cords 262 to foreshorten by 86% of its original length, compared to 46% of a fixed length cord, before this limit is reached. The length of the actuator at the maximum helix angle, alpha max is:

Linit/cos(pi-alpha max)-Linit where Linit is the distance between the fixed pin or pulley and the rotating input. Therefore, percent foreshortening is:

(Linit/cos(pi-alpha max)-Linit/Linit=0.86

Further, in the conventional twisted string actuator 260 of FIG. 35, the output 266 is nonlinear. Furthermore, when a pair of twisted string actuators is used in an antagonistic manner, for example, to move a lever, or arm, around a pivot point, or joint, one actuator lengthens while the opposite one shortens, each in a non-linear manner. Therefore, if two tendons connected to the twisted string actuators were used to actuate a robot joint by wrapping the tendons around a circular pulley at that joint, the tension in the tendons would change when the joint is moved. In some joint positions the tendons would be slack and the position of the joint would not be known and not be controlled.

To linearize the output action of a set of opposing, antagonistic, twisted string actuators, a non-circular pulley can be used. Each tendon is fixed to a noncircular cam, which shares a common axis of rotation. The specific shape of the cam is determined algebraically. In this way, both tendons remain in proper tension as the actuator system moves through its designed range of operation.

Reference in the specification to "one embodiment" or "an embodiment" means that a particular, feature, structure or characteristic described in connection with the embodiment is included in at least one embodiment of the teaching. References to a particular embodiment within the specification do not all necessarily refer to the same embodiment. The terminology used herein is for the purpose of describing particular embodiments only and is not intended to be limiting of the invention.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages.

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

While the invention has been shown and described with reference to specific preferred embodiments, it should be understood by those skilled in the art that various changes in form and detail may be made therein without departing from the spirit and scope of the invention as defined by the following claims.

What is claimed is:

1. An underactuated robotic finger assembly comprising:
a finger skeleton with multiple joints including a distal joint, an intermediate joint, and a proximal joint; and
a brake subsystem, in communication with each of the joints, adapted to selectively lock and unlock the joints individually, wherein the brake subsystem includes a multilayer electrolaminate composite structure that is integrated into each joint, the multilayer electrolaminate composite structure stiffening the joint in response to an electrical signal.

2. The assembly of claim 1, wherein the brake subsystem includes segments of multilayer electrolaminate composite structures, and wherein the layers of the multilayer electrolaminate composite structures of neighboring segments overlap at each joint.

3. The assembly of claim 1, further comprising a tendon routed through the finger skeleton around each of the joints to provide an actuator that bends the joints.

4. The assembly of claim 3, further comprising a spring return coupled to each of the joints to urge the joints to extend.

5. The assembly of claim 1, wherein the brake subsystem can lock and unlock two or more joints as a group.

6. The assembly of claim 1, further comprising a skin layer on the finger skeleton having electroadhesive pads.

7. The assembly of claim 1, further comprising an electrically controllable skin layer on the finger skeleton.

8. The assembly of claim 1, further comprising a skin layer on the finger skeleton having sensors integrated into a flex circuit board that extends to each phalange and joint of the finger skeleton.

9. The assembly of claim 8, wherein the sensors includes a pressure sensor for each phalange of the finger skeleton.

10. The assembly of claim 9, where the sensors include a position sensor for each joint of the finger skeleton.

11. The assembly of claim 1, wherein each joint includes an embedded position sensor for detecting a current position of that joint.

12. The assembly of claim 1, further comprising a fingertip with an accelerometer.

13. A robotic finger module comprising:
an actuator module; and
an underactuated finger assembly mounted to the actuator module, the finger assembly comprising:
a finger skeleton with multiple joints including a distal joint, an intermediate joint, and a proximal joint; and
a brake subsystem, in communication with each of the joints, adapted to selectively lock and unlock the joints individually, wherein the brake subsystem includes a multilayer electrolaminate composite structure that is integrated into each joint, the multilayer electrolaminate composite structure stiffening the joint in response to an electrical signal.

14. The module of claim 13, wherein the actuator module includes a motor connected to a twisted-string cable, the cable being operatively coupled to an actuator that flexes the joints.

15. The module of claim 14, wherein the finger assembly further comprises a tendon routed through the underactuated finger around each of the joints to provide the actuator that bends the joints.

16. The module of claim 15, wherein the finger assembly further comprises a spring return coupled to each of the joints to urge the joints to extend.

17. The module of claim 13, wherein the actuator module includes a backdriveable transmission.

18. The module of claim 13, wherein the brake subsystem includes segments of multilayer electrolaminate composite structures, and wherein the layers of the multilayer electrolaminate composite structures of neighboring segments overlap at each joint.

19. The module of claim 13, wherein the brake subsystem can lock and unlock two or more joints as a group.

20. The module of claim 13, wherein the finger assembly further comprises a skin layer with electroadhesive pads.

21. The module of claim 13, wherein the finger assembly further comprises an electrically controllable skin layer.

22. The module of claim 13, wherein the finger assembly further comprises a skin layer with sensors integrated into a flex circuit board that extends to each phalange and joint of the finger.

23. The module of claim 22, wherein the sensors includes a pressure sensor for each phalange of the finger skeleton.

24. The module of claim 23, wherein the sensors include a position sensor for each joint of the finger skeleton.

25. The module of claim 13, wherein each joint includes an embedded position sensor for detecting a current position of that joint.

26. The module of claim 13, wherein the finger assembly further comprises a fingertip with an accelerometer.

27. A robotic manipulator system comprising:
a palm assembly;
one or more finger modules coupled to the palm assembly, each finger module comprising:
an actuator module; and
an underactuated finger assembly mounted to the actuator module, the finger assembly comprising:
a finger skeleton with multiple joints including a distal joint, an intermediate joint, and a proximal joint; and
a brake subsystem, in communication with each of the joints, adapted to selectively lock and unlock the joints individually, wherein the brake subsystem includes a multilayer electrolaminate composite structure that is integrated into each joint, the multilayer electrolaminate composite structure stiffening the joint in response to an electrical signal.

28. The robotic manipulator system of claim 27, wherein the one or more finger modules includes two finger modules that oppose each other from opposite sides of the palm assembly.

29. The robotic manipulator system of claim 28, wherein one of the finger modules is fixed to one of the opposite sides of the palm assembly and the other of the two modules is movably coupled to the other of the opposite sides of the palm assembly.

30. A method of moving a robotic hand with an underactuated finger having a plurality of joints, the method comprising:
selectively locking the joints individually such that one or more of the joints are locked while one or more of the joints are unlocked; and
driving a tendon coupled to the joints to flex the underactuated finger in a manner determined by which of the joints is locked and which of the joints is unlocked; and further comprising selectively locking and unlocking the joints individually in rapid succession such that the joints appear to move and be controlled simultaneously.

* * * * *